United States Patent
Oka et al.

(10) Patent No.: US 10,174,166 B2
(45) Date of Patent: **\*Jan. 8, 2019**

(54) POLYIMIDE PRECURSOR, POLYIMIDE, VARNISH, POLYIMIDE FILM, AND SUBSTRATE

(71) Applicant: Ube Industries, Ltd., Ube-shi (JP)

(72) Inventors: Takuya Oka, Ube (JP); Yukinori Kohama, Ube (JP); Yoshiyuki Watanabe, Ube (JP); Nobuharu Hisano, Ube (JP)

(73) Assignee: UBE INDUSTRIES, LTD., Ube-shi (JP)

( * ) Notice: Subject to any disclaimer, the term of this patent is extended or adjusted under 35 U.S.C. 154(b) by 595 days.

This patent is subject to a terminal disclaimer.

(21) Appl. No.: 14/426,953

(22) PCT Filed: Sep. 10, 2013

(86) PCT No.: PCT/JP2013/074420
§ 371 (c)(1),
(2) Date: Aug. 21, 2015

(87) PCT Pub. No.: WO2014/038714
PCT Pub. Date: Mar. 13, 2014

(65) Prior Publication Data
US 2015/0361222 A1 Dec. 17, 2015

(30) Foreign Application Priority Data
Sep. 10, 2012 (JP) .................. 2012-198935

(51) Int. Cl.
*C08G 73/10* (2006.01)
*C08J 5/18* (2006.01)
(Continued)

(52) U.S. Cl.
CPC ..... *C08G 73/1007* (2013.01); *C08G 73/0644* (2013.01); *C08G 73/105* (2013.01);
(Continued)

(58) Field of Classification Search
CPC .............................................. C08G 73/1007
See application file for complete search history.

(56) References Cited

U.S. PATENT DOCUMENTS

| | | | |
|---|---|---|---|
| 2003/0104232 A1 | 6/2003 | Kihara et al. | |
| 2009/0068403 A1 | 3/2009 | Yasuda et al. | |

(Continued)

FOREIGN PATENT DOCUMENTS

| | | |
|---|---|---|
| JP | A-H06-51316 | 2/1994 |
| JP | A-2002-069179 | 3/2002 |

(Continued)

OTHER PUBLICATIONS

Kusama et al.; "Soluble Polyimides with Polyalicyclic Structure. 3.[1] Polyimides from (4arH,8acH)-Decahydro-1t, 4t: 5c, 8c-dimethanonaphthalene-2t, 3t, 6c, 7c-tetracarboxylic 2,3: 6, 7-Dianhydride" Macromolecules 1994, vol. 27, No. 5, pp. 1117-1123.
(Continued)

*Primary Examiner* — Vickey Nerangis
(74) *Attorney, Agent, or Firm* — Knobbe Martens Olson & Bear LLP

(57) ABSTRACT

A polyimide precursor comprising a repeating unit represented by the following chemical formula (1):

Chemical formula (1)

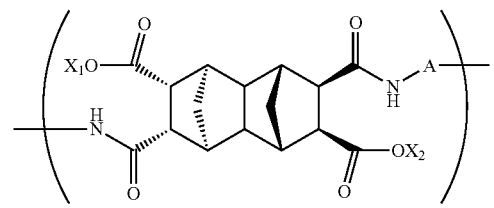

in which A is a divalent group of an aromatic diamine or an aliphatic diamine, from which amino groups have been removed; and $X_1$ and $X_2$ are each independently hydrogen, an alkyl group having 1 to 6 carbon atoms, or an alkylsilyl group having 3 to 9 carbon atoms, wherein the polyimide precursor comprises at least one type of repeating unit represented by the chemical formula (1) in which A is a group represented by chemical formula (2) or (3):

Chemical formula (2)

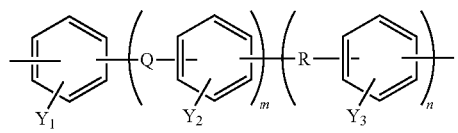

in which m independently represents 0 to 3 and n independently represents 0 to 3; $Y_1$, $Y_2$ and $Y_3$ each independently represent at least one selected from the group consisting of hydrogen atom, methyl group and trifluoromethyl group; and Q and R each independently represent direct bond, or at least one of —NHCO—, —CONH—, —COO— and —OCO—, Chemical formula (3)

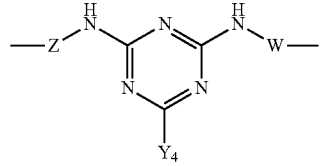

in which Z and W each independently represent a divalent aromatic group having 6 to 18 carbon atoms; and $Y_4$ represents hydrogen atom, or a monovalent organic group.

19 Claims, No Drawings

(51) Int. Cl.
    *C09D 179/08* (2006.01)
    *C08G 73/06* (2006.01)
    *C08G 73/14* (2006.01)
    *C08G 73/16* (2006.01)

(52) U.S. Cl.
    CPC ..... *C08G 73/1039* (2013.01); *C08G 73/1042* (2013.01); *C08G 73/1075* (2013.01); *C08G 73/1078* (2013.01); *C08G 73/1085* (2013.01); *C08G 73/14* (2013.01); *C08G 73/16* (2013.01); *C08J 5/18* (2013.01); *C09D 179/08* (2013.01); *C08J 2379/08* (2013.01)

(56) References Cited

U.S. PATENT DOCUMENTS

| | | | |
|---|---|---|---|
| 2010/0187719 | A1 | 7/2010 | Oishi et al. |
| 2012/0308816 | A1 | 12/2012 | Kohama et al. |
| 2014/0066571 | A1 | 3/2014 | Takasawa et al. |
| 2015/0284513 | A1* | 10/2015 | Oka ..................... C09D 179/08 524/600 |

FOREIGN PATENT DOCUMENTS

| | | |
|---|---|---|
| JP | A-2002-146021 | 5/2002 |
| JP | A-2003-168800 | 6/2003 |
| JP | A-2007-002023 | 1/2007 |
| JP | A-2013-166929 | 8/2013 |
| WO | WO2008/146637 | 12/2008 |
| WO | WO 2011/099555 A1 | 8/2011 |

OTHER PUBLICATIONS

Toshihiko Matsumoto; "Nonaromatic Polyimides Derived from Cycloaliphatic Monomers" *Macromolecules*, 1999, vol. 32, No. 15 , pp. 4933-4939.

International Preliminary Report on Patentability in International Application No. PCT/JP2013/074420, dated Mar. 10, 2015.

Office Action in related Chinese Patent Application No. 201380058630.8 , dated Apr. 21, 2016.

Office Action in U.S. Appl. No. 14/426,954, dated Jun. 28, 2016.

* cited by examiner

POLYIMIDE PRECURSOR, POLYIMIDE, VARNISH, POLYIMIDE FILM, AND SUBSTRATE

TECHNICAL FIELD

The present invention relates to a polyimide having excellent properties such as high transparency, bending resistance and high heat resistance, and having a very low coefficient of linear thermal expansion; a precursor thereof; and the like.

BACKGROUND ART

With the coming of an advanced information society, the developments of optical materials such as an optical fiber and an optical wave guide in the field of optical communications, and optical materials such as a liquid crystal oriented film and a protective film for a color-filter in the field of display devices have recently advanced. In the field of display devices, in particular, a plastic substrate which is light-weight and excellent in flexibility has been studied as an alternative to a glass substrate, and the development of a display which is capable of being bent and rolled has been intensively conducted. Accordingly, there is need for a higher-performance optical material which may be used for such purposes.

Aromatic polyimides are intrinsically yellowish-brown-colored due to the intramolecular conjugation and the formation of charge-transfer complexes. Consequently, as a means of reducing coloring, methods of developing transparency, for example, by introducing fluorine atom into the molecule, imparting flexibility to the main chain, introducing a bulky group as a side chain, or the like to suppress the intramolecular conjugation and the formation of charge-transfer complexes are proposed. In addition, methods of developing transparency by the use of a semi-alicyclic or wholly-alicyclic polyimide which do not form charge-transfer complexes in principle are also proposed.

Patent Literature 1 discloses that a thin-film transistor substrate is obtained by forming a thin-film transistor on a film substrate of a transparent polyimide in which the residue of the tetracarboxylic acid component is an aliphatic group by the use of a conventional film-forming process in order to obtain a thin, light-weight and break-proof active matrix display device. The polyimide concretely used herein is prepared from 1,2,4,5-cyclohexane tetracarboxylic dianhydride as the tetracarboxylic acid component and 4,4'-diaminodiphenyl ether as the diamine component.

Patent Literature 2 discloses a process for producing a colorless transparent resin film formed of a polyimide having excellent colorlessness/transparency, heat resistance and flatness, which is used for a transparent substrate for a liquid crystal display device or an organic EL display device, a thin-film transistor substrate, a flexible wiring substrate, and the like, by a solution-casting method using a particular drying step. The polyimide used herein is prepared from 1,2,4,5-cyclohexane tetracarboxylic dianhydride as the tetracarboxylic acid component and α,α'-bis(4-aminophenyl)-1,4-diisopropylbenzene and 4,4'-bis(4-aminophenoxy)biphenyl as the diamine component, and the like.

Patent Literatures 3 and 4 disclose polyimides which are soluble in organic solvents, and prepared using dicyclohexyl tetracarboxylic acid as the tetracarboxylic acid component and diaminodiphenyl ether, diaminodiphenyl methane, 1,4-bis(4-aminophenoxy)benzene, 1,3-bis(4-aminophenoxy)benzene, 2,2-bis[4-(4-aminophenoxy)phenyl]propane, bis[4-(4-aminophenoxy)phenyl]sulfone, bis[4-(4-aminophenoxy)phenyl]ether or m-phenylenediamine as the diamine component.

Such a semi-alicyclic polyimide, in which an alicyclic tetracarboxylic dianhydride is used as the tetracarboxylic acid component and an aromatic diamine is used as the diamine component, combines high transparency, bending resistance and high heat resistance. However, such a semi-alicyclic polyimide generally has a great coefficient of linear thermal expansion of 50 ppm/K or more, and therefore the difference in coefficient of linear thermal expansion between a semi-alicyclic polyimide and a conductive material such as a metal is great, and a trouble such as an increase in warpage may occur during the formation of a circuit board, and there has been a problem of not easily performing a process for forming a fine circuit for use in a display, or the like, in particular.

Non Patent Literature 1 discloses a polyimide prepared using (4arH,8acH)-decahydro-1t,4t:5c,8c-dimethanonaphthalene-2t,3t,6c,7c-tetracarboxylic acid, or the like as the tetracarboxylic acid component and 4,4'-diaminodiphenyl ether (DDE), 4,4'-diaminodiphenyl methane (DDM), 4,4'-diaminodiphenyl sulfone (DDS), 3,3'-diaminodiphenyl ketone (DDK), 1,3-bis(4-aminophenoxy)benzene (BAB) or 2,2-bis[4-(4-aminophenoxyl)phenyl]propane (BAPP) as the diamine component. Non Patent Literature 2 discloses a polyimide prepared using (4arH,8acH)-decahydro-1t,4t:5c,8c-dimethanonaphthalene-2c,3c,6c,7c-tetracarboxylic acid, or the like as the tetracarboxylic acid component and 4,4'-diaminodiphenyl ether (DDE) or 1,3-bis(4-aminophenoxy)benzene (BAB) as the diamine component. Non Patent Literatures 1 and 2 disclose polyimides prepared using different stereoisomers of decahydro-1,4:5,8-dimethanonaphthalene-2,3,6,7-tetracarboxylic acid, or the like, and there is no significant difference in properties between them. Additionally, no mention is made of the coefficient of linear thermal expansion in Non Patent Literatures 1 and 2.

Patent Literature 5 discloses a polyimide prepared using decahydro-1,4:5,8-dimethanonaphthalene-2,3,6,7-tetracarboxylic acid, or the like as the tetracarboxylic acid component and 2,2'-bis(trifluoromethyl)benzidine, 2,2'-dichlorobenzidine or 4,4'-oxydianiline as the diamine component. Although Patent Literature 5 discloses that the polyimide has high transparency and has a high glass-transition temperature, no mention is made of the coefficient of linear thermal expansion. Additionally, no mention is made of steric structure of decahydro-1,4:5,8-dimethanonaphthalene-2,3,6,7-tetracarboxylic acid, or the like.

Patent Literature 6 discloses a liquid crystal alignment agent comprising a polyimide prepared using decahydro-1,4:5,8-dimethanonaphthalene-2,3,6,7-tetracarboxylic acid, or the like as the tetracarboxylic acid component and 4,4'-diaminodiphenyl methane, p-phenylenediamine or 4,4'-methylene bis(cyclohexylamine) as the diamine component. However, no mention is made of the properties such as transparency and coefficient of linear thermal expansion of the obtained polyimide, and steric structure of decahydro-1,4:5,8-dimethanonaphthalene-2,3,6,7-tetracarboxylic acid, or the like.

CITATION LIST

Patent Literature

Patent Literature 1: JP-A-2003-168800
Patent Literature 2: WO 2008/146637
Patent Literature 3: JP-A-2002-69179

Patent Literature 4: JP-A-2002-146021
Patent Literature 5: JP-A-2007-2023
Patent Literature 6: JP-A-H06-51316

Non Patent Literature

Non Patent Literature 1: Macromolecules, Vol. 27, No. 5, P. 1117-1123, 1994
Non Patent Literature 2: Macromolecules, Vol. 32, No. 15, P. 4933-4939, 1999

SUMMARY OF INVENTION

Technical Problem

The present invention was made in view of the circumstances as described above, and an object thereof is to improve the coefficient of linear thermal expansion of a polyimide in which an alicyclic tetracarboxylic dianhydride is used as the tetracarboxylic acid component.

In other words, an object of the present invention is to provide a polyimide having excellent properties such as high transparency, bending resistance and high heat resistance, and having a very low coefficient of linear thermal expansion; and a precursor thereof.

Solution to Problem

The present invention relates to the following items.

[1] A polyimide precursor comprising a repeating unit represented by the following chemical formula (1);

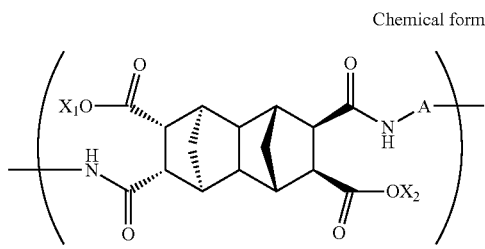

Chemical formula (1)

wherein A is a divalent group of an aromatic diamine or an aliphatic diamine, from which amino groups have been removed; and $X_1$ and $X_2$ are each independently hydrogen, an alkyl group having 1 to 6 carbon atoms, or an alkylsilyl group having 3 to 9 carbon atoms,
wherein the polyimide precursor comprises at least one type of repeating unit represented by the chemical formula (1) in which A is a group represented by any one of the following chemical formulas (2) and (3):

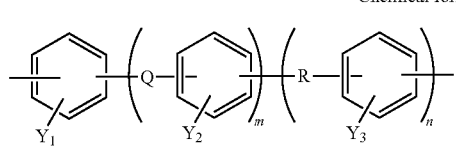

Chemical formula (2)

wherein m independently represents 0 to 3 and n independently represents 0 to 3; $Y_1$, $Y_2$ and $Y_3$ each independently represent at least one selected from the group consisting of hydrogen atom, methyl group and trifluoromethyl group; and Q and R each independently represent direct bond, or at least one selected from the group consisting of groups represented by the formulas: —NHCO—, —CONH—, —COO— and —OCO—,

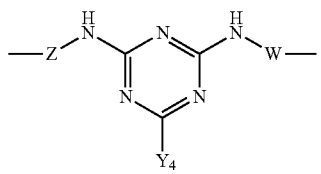

Chemical formula (3)

wherein Z and W each independently represent a divalent aromatic group having 6 to 18 carbon atoms; and $Y_4$ represents hydrogen atom, or a monovalent organic group.

[2] The polyimide precursor as described in [1], wherein the polyimide precursor comprises the repeating unit represented by the chemical formula (1) in a ratio of 50 mol % or more in total based on the total repeating units.

[3] The polyimide precursor as described in [1] or [2], wherein the polyimide precursor comprises the repeating unit represented by the chemical formula (1) in a ratio of 70 mol % or more in total based on the total repeating units.

[4] A polyimide comprising a repeating unit represented by the following chemical formula (4):

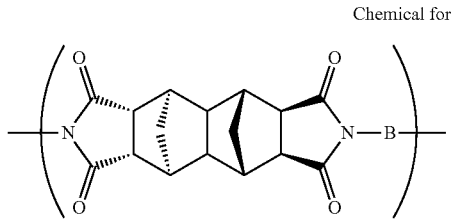

Chemical formula (4)

wherein B is a divalent group of an aromatic diamine or an aliphatic diamine, from which amino groups have been removed,
wherein the polyimide comprises at least one type of repeating unit represented by the chemical formula (4) in which B is a group represented by any one of the following chemical formulas (5) and (6):

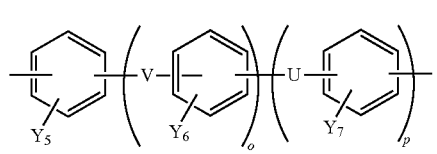

Chemical formula (5)

wherein o independently represents 0 to 3 and p independently represents 0 to 3; $Y_5$, $Y_6$ and $Y_7$ each independently represent at least one selected from the group consisting of hydrogen atom, methyl group and trifluoromethyl group; and V and U each independently represent direct bond, or at least one selected from the group consisting of groups represented by the formulas: —NHCO—, —CONH—, —COO— and —OCO—,

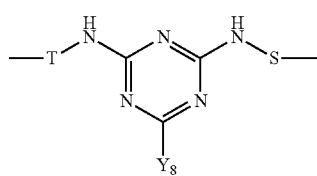

Chemical formula (6)

wherein T and S each independently represent a divalent aromatic group having 6 to 18 carbon atoms; and $Y_8$ represents hydrogen atom, or a monovalent organic group.

[5] The polyimide as described in [4], wherein the polyimide comprises the repeating unit represented by the chemical formula (4) in a ratio of 50 mol % or more in total based on the total repeating units.

[6] The polyimide as described in [4] or [5], wherein the polyimide comprises the repeating unit represented by the chemical formula (4) in a ratio of 70 mol % or more in total based on the total repeating units.

[7] A polyimide obtained from the polyimide precursor as described in any one of [1] to [3].

[8] The polyimide as described in any one of [4] to [7], wherein the polyimide has a coefficient of linear thermal expansion from 50° C. to 200° C. of 50 ppm/K or less and a 5% weight loss temperature of more than 480° C.

[9] A varnish comprising the polyimide precursor as described in any one of [1] to [3], or the polyimide as described in any one of [4] to [8].

[10] A polyimide film obtained using a varnish comprising the polyimide precursor as described in any one of [1] to [3], or the polyimide as described in any one of [4] to [8].

[11] A substrate for a display, a touch panel or a solar battery formed of the polyimide obtained from the polyimide precursor as described in any one of [1] to [3], or the polyimide as described in any one of [4] to [8].

Advantageous Effects of Invention

According to the present invention, there may be provided a polyimide having excellent properties such as high transparency, bending resistance and high heat resistance, and having a very low coefficient of linear thermal expansion; and a precursor thereof. The polyimide obtained from the polyimide precursor of the present invention, and the polyimide of the present invention have high transparency and a low coefficient of linear thermal expansion and a fine circuit may be easily formed thereon, and the polyimides may be suitably used for the formation of a substrate for use in a display, or the like. In addition, the polyimides of the present invention may also be suitably used for the formation of a substrate for a touch panel or a solar battery.

DESCRIPTION OF EMBODIMENTS

The polyimide precursor of the present invention is a polyimide precursor comprising a repeating unit represented by the chemical formula (1). The chemical formula (1), however, indicates that in the decahydro-1,4:5,8-dimethanonaphthalene ring, the acid group in either 2-position or 3-position reacts with an amino group to form an amide bond (—CONH—) and the other is a group represented by the formula: —COOX$_1$, which does not form an amide bond, and the acid group in either 6-position or 7-position reacts with an amino group to form an amide bond (—CONH—) and the other is a group represented by the formula: —COOX$_2$, which does not form an amide bond. In other words, the chemical formula (1) includes all of the four structural isomers, that is, (i) the one having a group represented by the formula: —COOX$_1$ in the 2-position and a group represented by the formula: —CONH— in the 3-position, and having a group represented by the formula: —COOX$_2$ in the 6-position and a group represented by the formula: —CONH-A- in the 7-position;

(ii) the one having a group represented by the formula: —COOX$_1$ in the 3-position and a group represented by the formula: —CONH— in the 2-position, and having a group represented by the formula: —COOX$_2$ in the 6-position and a group represented by the formula: —CONH-A- in the 7-position;

(iii) the one having a group represented by the formula: —COOX$_1$ in the 2-position and a group represented by the formula: —CONH— in the 3-position, and having a group represented by the formula: —COOX$_2$ in the 7-position and a group represented by the formula: —CONH-A- in the 6-position; and (iv) the one having a group represented by the formula: —COOX$_1$ in the 3-position and a group represented by the formula: —CONH— in the 2-position, and having a group represented by the formula: —COOX$_2$ in the 7-position and a group represented by the formula: —CONH-A- in the 6-position.

Additionally, the polyimide precursor of the present invention comprises at least one type of repeating unit represented by the chemical formula (1) in which the "A" is a group represented by any one of the chemical formulas (2) and (3).

In other words, the polyimide precursor of the present invention is a polyimide precursor obtained from a tetracarboxylic acid component comprising (4arH, 8acH)-decahydro-1t,4t:5c,8c-dimethanonaphthalene-2 t,3t, 6c,7c-tetracarboxylic acid, or the like (The term "tetracarboxylic acid, or the like" means tetracarboxylic acid, and tetracarboxylic acid derivatives including tetracarboxylic dianhydride, tetracarboxylic acid silyl ester, tetracarboxylic acid ester and tetracarboxylic acid chloride), and a diamine component comprising a diamine component to provide a repeating unit of the chemical formula (1) in which the "A" is a group represented by the chemical formula (2) or the chemical formula (3).

As the tetracarboxylic acid component to provide a repeating unit of the chemical formula (1), (4arH,8acH)-decahydro-1t,4t:5c,8c-dimethanonaphthalene-2t,3t,6c,7c-tetracarboxylic acid, or the like may be used alone or in combination of a plurality of types.

The diamine component to provide a repeating unit of the chemical formula (1) comprises a diamine to provide the one in which the "A" is a group represented by the chemical formula (2) and/or a diamine to provide the one in which the "A" is a group represented by the chemical formula (3).

The diamine component to provide a repeating unit of the chemical formula (1) in which the "A" is a group represented by the chemical formula (2) has an aromatic ring, and when the diamine component has a plurality of aromatic rings, the aromatic rings are each independently linked to each other by direct bond, amide bond, or ester bond. When the aromatic rings are linked at the 4-position relative to the amino group or the linking group between the aromatic rings, the obtained polyimide has a linear structure and may have low linear thermal expansibility, although the linking position of the aromatic rings is not limited thereto. Meanwhile, the aromatic ring may be substituted by methyl or trifluoromethyl. The substitution position is not particularly limited.

Examples of the diamine component to provide a repeating unit of the chemical formula (1) in which the "A" is a group represented by the chemical formula (2) include, but not limited to, p-phenylenediamine, m-phenylenediamine, benzidine, 3,3'-diamino-biphenyl, 2,2'-bis(trifluoromethyl)benzidine, 3,3'-bis(trifluoromethyl)benzidine, o-tolidine, m-tolidine, 4,4'-diaminobenzanilide, 3,4'-diaminobenzanilide, N,N'-bis(4-aminophenyl)terephthalamide, N,N'-p-phenylene bis(p-aminobenzamide), 4-aminophenoxy-4-diaminobenzoate, bis(4-aminophenyl)terephthalate, biphenyl-4,4'-dicarboxylic acid bis(4-aminophenyl)ester, p-phenylene bis(p-aminobenzoate), bis(4-aminophenyl)-[1,1'-biphenyl]-4,4'-dicarboxylate, and [1,1'-biphenyl]-4,4'-diyl bis(4-aminobenzoate). The diamine component may be used alone or in combination of a plurality of types. Among them, p-phenylenediamine, o-tolidine, m-tolidine, 4,4'-diaminobenzanilide, 4-aminophenoxy-4-diaminobenzoate, 2,2'-bis(trifluoromethyl)benzidine, benzidine, N,N'-bis(4-aminophenyl)terephthalamide, and biphenyl-4,4'-dicarboxylic acid bis(4-aminophenyl)ester are preferred, and p-phenylenediamine, 4,4'-diaminobenzanilide, and 2,2'-bis(trifluoromethyl)benzidine are more preferred. When p-phenylenediamine, 4-aminophenoxy-4-diaminobenzanilide, or 2,2'-bis(trifluoromethyl)benzidine is used as the diamine component, the obtained polyimide may combine high heat resistance and high light transmittance. These diamines may be used alone or in combination of a plurality of types.

The diamine component to provide a repeating unit of the chemical formula (1) in which the "A" is a group represented by the chemical formula (3) has a triazine ring to which two NH groups are linked. A divalent aromatic group having 6 to 18 carbon atoms is independently linked to each of the two NH groups. Meanwhile, the triazine ring may be substituted by a monovalent organic group. Examples of the monovalent organic group include, but not limited to, methyl, ethyl, phenyl, amino, methylamino, dimethylamino, ethylamino, dimethylamino, anilino, diphenylamino, benzylamino, naphthylamino, dibenzylamino, dinaphthylamino, methylanilino, and methylnaphthylamino.

Examples of the diamine component to provide a repeating unit of the chemical formula (1) in which the "A" is a group represented by the chemical formula (3) include, but not limited to, 2,4-bis(4-aminoanilino)-1,3,5-triazine, 2,4-bis(4-aminoanilino)-6-methyl-1,3,5-triazine, 2,4-bis(4-aminoanilino)-6-ethyl-1,3,5-triazine, 2,4-bis(4-aminoanilino)-6-phenyl-1,3,5-triazine, 2,4-bis(4-aminoanilino)-6-amino-1,3,5-triazine, 2,4-bis(4-aminoanilino)-6-methylamino-1,3,5-triazine, 2,4-bis(4-aminoanilino)-6-dimethylamino-1,3,5-triazine, 2,4-bis(4-aminoanilino)-6-ethylamino-1,3,5-triazine, 2,4-bis(4-aminoanilino)-6-diethylamino-1,3,5-triazine, 2,4-bis(4-aminoanilino)-6-anilino-1,3,5-triazine, 2,4-bis(4-aminoanilino)-6-diphenylamino-1,3,5-triazine 2,4-bis(3-aminoanilino)-6-anilino-1,3,5-triazine, 2,4-bis(3-aminoanilino)-6-benzylamino-1,3,5-triazine, 2,4-bis(3-aminoanilino)-6-naphthylamino-1,3,5-triazine, 2,4-bis(3-aminoanilino)-6-biphenylamino-1,3,5-triazine, 2,4-bis(3-aminoanilino)-6-diphenylamino-1,3,5-triazine, 2,4-bis(3-aminoanilino)-6-dibenzylamino-1,3,5-triazine, 2,4-bis(3-aminoanilino)-6-dinaphthylamino-1,3,5-triazine, 2,4-bis(3-aminoanilino)-6-N-methylanilino-1,3,5-triazine, 2,4-bis(3-aminoanilino)-6-N-methylnaphthylamino-1,3,5-triazine, 2,4-bis(3-aminoanilino)-6-methylamino-1,3,5-triazine, 2,4-bis(3-aminoanilino)-6-ethylamino-1,3,5-triazine, 2,4-bis(3-aminoanilino)-6-dimethylamino-1,3,5-triazine, 2,4-bis(3-aminoanilino)-6-diethylamino-1,3,5-triazine, 2,4-bis(3-aminoanilino)-6-dibutylamino-1,3,5-triazine, and 2,4-bis(3-aminoanilino)-6-amino-1,3,5-triazine, and derivatives thereof. The diamine component may be used alone or in combination of a plurality of types. Among them, 2,4-bis(4-aminoanilino)-6-amino-1,3,5-triazine, 2,4-bis(4-aminoanilino)-6-methylamino-1,3,5-triazine, 2,4-bis(4-aminoanilino)-6-ethylamino-1,3,5-triazine, and 2,4-bis(4-aminoanilino)-6-anilino-1,3,5-triazine are preferred, and 2,4-bis(4-aminoanilino)-6-anilino-1,3,5-triazine is more preferred. These diamines may be used alone or in combination of a plurality of types.

As the diamine component to provide the "A" in the chemical formula (1) (that is, the diamine component to provide a repeating unit of the chemical formula (1)), the other diamines other than the diamine component to provide the one in which the "A" is a structure of the chemical formula (2) or the chemical formula (3) may be used together. Other aromatic or aliphatic diamines may be used as the other diamine component. Examples thereof include 4,4'-oxydianiline, 3,4'-oxydianiline, 3,3'-oxydianiline, p-methylene bis(phenylenediamine), 1,3-bis(4-aminophenoxy)benzene, 1,3-bis(3-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis(4-(4-aminophenoxy)phenyl)hexafluoropropane, 2,2-bis(4-aminophenyl)hexafluoropropane, bis(4-aminophenyl)sulfone, 3,3'-bis(trifluoromethyl)benzidine, 3,3'-bis((aminophenoxy)phenyl)propane, 2,2'-bis(3-amino-4-hydroxyphenyl)hexafluoropropane, bis(4-(4-aminophenoxy)diphenyl)sulfone, bis(4-(3-aminophenoxy)diphenyl)sulfone, octafluorobenzidine, 3,3'-dimethoxy-4,4'-diaminobiphenyl, 3,3'-dichloro-4,4'-diaminobiphenyl, 3,3'-difluoro-4,4'-diaminobiphenyl, 1,4-diaminocyclohexane, 1,4-diamino-2-methylcyclohexane, 1,4-diamino-2-ethylcyclohexane, 1,4-diamino-2-n-propylcyclohexane, 1,4-diamino-2-isopropylcyclohexane, 1,4-diamino-2-n-butylcyclohexane, 1,4-diamino-2-isobutylcyclohexane, 1,4-diamino-2-sec-butylcyclohexane, 1,4-diamino-2-tert-butylcyclohexane, 1,2-diaminocyclohexane, and 1,4-diaminocyclohexane, and derivatives thereof. The diamine component may be used alone or in combination of a plurality of types. Among them, 4,4'-oxydianiline, 3,4'-oxydianiline, 3,3'-oxydianiline, p-methylene bis(phenylenediamine), 1,3-bis(4-aminophenoxy)benzene, 1,3-bis(3-aminophenoxy)benzene, 1,4-bis(4-aminophenoxy)benzene, 4,4'-bis(4-aminophenoxy)biphenyl, and 4,4'-bis(3-aminophenoxy)biphenyl are preferred, and 4,4'-bis(4-aminophenoxy)biphenyl is particularly preferred.

In the polyimide precursor of the present invention, the ratio of the repeating units represented by the chemical formula (1) in which the "A" is a group represented by any one of the chemical formulas (2) and (3) is preferably 50 mol % or more, more preferably 70 mol % or more, further preferably 90 mol % or more, particularly preferably 100 mol %, in total based on 100 mol % of the repeating unit represented by the chemical formula (1). When the ratio of the repeating units represented by the chemical formula (1) in which the "A" is a group represented by any one of the chemical formulas (2) and (3) is less than 50 mol %, the coefficient of linear thermal expansion of the obtained polyimide may be greater.

In one embodiment, in view of the properties of the obtained polyimide, the ratio of the diamine component to provide a structure of the chemical formula (2) or (3) may be preferably 70 mol % or less, more preferably 80 mol % or less, further preferably 90 mol % or less, in total based on 100 mol % of the diamine component to provide a repeating unit of the chemical formula (1). For example, other diamines, including diamine containing ether bond (—O—) such as 4,4'-oxydianiline and 4,4'-bis(4-aminophenoxy)biphenyl, may be used preferably in an amount of, for example, not more than 40 mol %, preferably not more than 30 mol %, more preferably not more than 20 mol %, further preferably not more than 10 mol %, based on 100 mol % of the diamine component to provide a repeating unit of the chemical formula (1).

In the polyimide precursor of the present invention, which comprises a repeating unit represented by the chemical formula (1), the "A" in the chemical formula (1) is preferably the chemical formula (2). In other words, the diamine component to provide a repeating unit of the chemical formula (1) is preferably a diamine component to provide a repeating unit of the chemical formula (1) in which the "A" is a group represented by the chemical formula (2). When the diamine component to provide the "A" in the chemical formula (1) (that is, the diamine component to provide a repeating unit of the chemical formula (1)) is a diamine component to provide a repeating unit of the chemical formula (1) in which the "A" is a group represented by the chemical formula (2), the heat resistance of the obtained polyimide may be improved.

The polyimide precursor of the present invention, which comprises a repeating unit represented by the chemical formula (1), preferably comprises at least two types of repeating units of the chemical formula (1) in which the "A" is a group represented by the chemical formula (2). In other words, the diamine component to provide a repeating unit of the chemical formula (1) preferably comprises at least two types of diamine components to provide a repeating unit of the chemical formula (1) in which the "A" is a group represented by the chemical formula (2). When the diamine component to provide the "A" in the chemical formula (1) (that is, the diamine component to provide a repeating unit of the chemical formula (1)) comprises at least two types of diamine components to provide the one in which the "A" is a structure of the chemical formula (2), the balance between high transparency and low linear thermal expansibility of the obtained polyimide may be achieved (that is, a polyimide having high transparency and low coefficient of linear thermal expansion may be obtained).

In the polyimide precursor of the present invention, which comprises a repeating unit represented by the chemical formula (1), the diamine component to provide the "A" in the chemical formula (1) (that is, the diamine component to provide a repeating unit of the chemical formula (1)) preferably comprises at least two types of diamine components to provide the one in which the "A" is a structure of the chemical formula (2), one of which is 4,4'-diaminobenzanilide. When the diamine component to provide the "A" in the chemical formula (1) comprises at least two types of diamine components to provide a structure of the chemical formula (2), one of which is 4,4'-diaminobenzanilide, a polyimide having high heat resistance in addition to high transparency and low linear thermal expansibility may be obtained.

In the polyimide precursor of the present invention, which comprises a repeating unit represented by the chemical formula (1), the diamine component to provide the "A" in the chemical formula (1) (that is, the diamine component to provide a repeating unit of the chemical formula (1)) preferably comprises at least one selected from 2,2'-bis(trifluoromethyl)benzidine and p-phenylenediamine, and 4,4'-diaminobenzanilide. When these diamine components are combined together, a polyimide having high transparency and low linear thermal expansibility, and high heat resistance may be obtained.

The diamine component to provide the "A" in the chemical formula (1) (that is, the diamine component to provide a repeating unit of the chemical formula (1)) preferably comprises 4,4'-diaminobenzanilide in an amount of 20 mol % or more and 80 mol % or less, and either one or both of p-phenylenediamine and 2,2'-bis(trifluoromethyl)benzidine in an amount of 20 mol % or more and 80 mol % or less, and more preferably comprises 4,4'-diaminobenzanilide in an amount of 30 mol % or more and 70 mol % or less, and either one or both of p-phenylenediamine and 2,2'-bis(trifluoromethyl)benzidine in an amount of 30 mol % or more and 70 mol % or less, and particularly preferably comprises 4,4'-diaminobenzanilide in an amount of 40 mol % or more and 60 mol % or less, and either one or both of p-phenylenediamine and 2,2'-bis(trifluoromethyl)benzidine in an amount of 40 mol % or more and 60 mol % or less.

The polyimide precursor of the present invention may comprise other repeating units other than the repeating unit represented by the chemical formula (1).

Other aromatic or aliphatic tetracarboxylic acid, or the like may be used as the tetracarboxylic acid component to provide other repeating units. Examples thereof include derivatives of, and dianhydrides of 2,2-bis(3,4-dicarboxyphenyl)hexafluoropropane, 4-(2,5-dioxotetrahydrofuran-3-yl)-1,2,3,4-tetrahydronaphthalene-1,2-dicarboxylic acid, pyromellitic acid, 3,3',4,4'-benzophenone tetracarboxylic acid, 3,3',4,4'-biphenyl tetracarboxylic acid, 2,3,3',4'-biphenyl tetracarboxylic acid, 4,4'-oxydiphthalic acid, bis(3,4-dicarboxyphenyl)sulfone dianhydride, m-terphenyl-3,4,3',4'-tetracarboxylic dianhydride, p-terphenyl-3,4,3',4'-tetracarboxylic dianhydride, biscarboxyphenyl dimethylsilane, his dicarboxy phenoxy diphenyl sulfide, sulfonyl diphthalic acid, 1,2,3,4-cyclobutane tetracarboxylic acid, isopropylidene diphenoxy his phthalic acid, cyclohexane-1,2,4,5-tetracarboxylic acid, [1,1'-bi(cyclohexane)]-3,3',4,4'-tetracarboxylic acid, [1,1'-bi(cyclohexane)]-2,3,3',4'-tetracarboxylic acid, [1,1'-bi(cyclohexane)]-2,2',3,3'-tetracarboxylic acid, 4,4'-methylene bis(cyclohexane-1,2-dicarboxylic acid), 4,4'-(propane-2,2-diyl)bis(cyclohexane-1,2-dicarboxylic acid), 4,4'-oxy bis(cyclohexane-1,2-dicarboxylic acid), 4,4'-thio bis(cyclohexane-1,2-dicarboxylic acid), 4,4'-sulfonyl bis(cyclohexane-1,2-dicarboxylic acid), 4,4'-(dimethylsilanediyl)bis(cyclohexane-1,2-dicarboxylic acid), 4,4'-(tetrafluoropropane-2,2-diyl)bis(cyclohexane-1,2-dicarboxylic acid), octahydropentalene-1,3,4,6-tetracarboxylic acid, bicyclo[2.2.1]heptane-2,3,5,6-tetracarboxylic acid, 6-(carboxymethyl)bicyclo[2.2.1]heptane-2,3,5-tricarboxylic acid, bicyclo[2.2.2]octane-2,3,5,6-tetracarboxylic acid, bicyclo[2.2.2]octa-5-ene-2,3,7,8-tetracarboxylic acid, tricyclo[4.2.2.02,5]decane-3,4,7,8-tetracarboxylic acid, tricyclo[4.2.2.02,5]deca-7-ene-3,4,9,10-tetracarboxylic acid, 9-oxatricyclo[4.2.1.02,5]nonane-3,4,7,8-tetracarboxylic acid, norbornane-2-spiro-α-cyclopentanone-α'-spiro-2"-norbornane-5,5",6,6"-tetracarboxylic acid, and (4arH,8acH)-decahydro-1t,4t:5c,8c-dimethanonaphthalene-2c,3c,6c,7c-tetracarboxylic acid, and the like. These may be used alone or in combination of a plurality of types. Among them, derivatives of, and dianhydrides of bicyclo[2.2.1]heptane-2,3,5,6-tetracarboxylic acid, bicyclo[2.2.2]octane-2,3,5,6-tetracarboxylic acid, norbornane-2-spiro-α-cyclopentanone-α'-spiro-2"-norbornane-5,5",6,6"-tetracarboxylic acid, and (4arH,8acH)-decahydro- 1t,4t:5c,8c-dimethanonaphthalene-2c,3c,6c,7c-tetracarboxylic acid, and the like are more preferred, because the polyimide is easily produced, and the obtained polyimide has excellent heat resistance. These dianhydrides may be used alone or in combination of a plurality of types.

The diamine component to provide other repeating units may be any one of the diamines described as the diamine component to provide a repeating unit of the chemical formula (1) in which the "A" is a group represented by the chemical formula (2) or (3).

Other aromatic or aliphatic diamines may be used as the diamine component to provide other repeating units. Examples thereof include 4,4'-oxydianiline, 3,4'-oxydianiline, 3,3'-oxydianiline, p-methylene bis(phenylenediamine), 1,3-bis(4-aminophenoxy)benzene, 1,3-bis(3-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis(4-(4-aminophenoxyl)phenyl)hexafluoropropane, 2,2-bis(4-aminophenyl)hexafluoropropane, bis(4-aminophenyl)sulfone, 3,3'-bis(trifluoromethyl)benzidine, 3,3'-bis((aminophenoxy)phenyl)propane, 2,2'-bis(3-amino-4-hydroxyphenyl)hexafluoropropane, bis(4-(4-aminophenoxyl)diphenyl)sulfone, bis(4-(3-aminophenoxy)diphenyl)sulfone, octafluorobenzidine, 3,3'-dimethoxy-4,4'-diaminobiphenyl, 3,3'-dichloro-4,4'-diaminobiphenyl, 3,3'-difluoro-4,4'-diaminobiphenyl, 1,4-diaminocyclohexane, 1,4-diamino-2-methylcyclohexane, 1,4-diamino-2-ethylcyclohexane, 1,4-diamino-2-n-propylcyclohexane, 1,4-diamino-2-isopropylcyclohexane, 1,4-diamino-2-n-butylcyclohexane, 1,4-diamino-2-isobutylcyclohexane, 1,4-diamino-2-sec-butylcyclohexane, 1,4-diamino-2-tert-butylcyclohexane, 1,2-diaminocyclohexane, and 1,4-diaminocyclohexane, and derivatives thereof. These may be used alone or in combination of a plurality of types.

The polyimide precursor of the present invention preferably comprises the repeating unit represented by the chemical formula (1) in an amount of not less than 50 mol %, more preferably not less than 70 mol %, further preferably not less than 90 mol %, particularly preferably 100 mol %, in total based on the total repeating units. When the ratio of the repeating unit represented by the chemical formula (1) is not less than 50 mol %, the film-forming properties may be improved and the obtained polyimide may have a very low coefficient of linear thermal expansion. In view of the total light transmittance, the ratio of the repeating unit represented by the chemical formula (1) may be preferably 50 mol % or more and 99 mol % or less, more preferably 60 mol % or more and 95 mol % or less, particularly preferably 70 mol % or more and 95 mol % or less, based on 100 mol % of the total repeating units, and such a polyimide precursor may be used.

The purity of the tetracarboxylic acid component to be used in the present invention may be preferably, but not limited to, 99% or more, more preferably 99.5% or more. (In the case where the component contains a plurality of structural isomers, the purity is determined on the condition that the structural isomers are regarded as the same component without distinguishing them. In the case where a plurality of types of tetracarboxylic acid components are used, the purity is the value of the tetracarboxylic acid component having the highest purity, or the average value of the purities of all tetracarboxylic acid components to be used which are determined separately and weighted with the mass ratio of the used components; for example, the purity of the tetracarboxylic acid component used is calculated to be 97% when 70 parts by mass of a tetracarboxylic acid component having a purity of 100% and 30 parts by mass of a tetracarboxylic acid component having a purity of 90% are used). When the purity is less than 98%, the molecular weight of the polyimide precursor may not be sufficiently increased and the obtained polyimide may have low heat resistance. The purity is a value which may be determined by gas chromatography analysis, liquid chromatography analysis, $^1$H-NMR analysis, or the like. In the case of a tetracarboxylic dianhydride, the purity may be determined by subjecting the tetracarboxylic dianhydride to hydrolysis treatment to form a tetracarboxylic acid, and determining the purity of the tetracarboxylic acid.

The purity of the diamine component to be used in the present invention may be preferably, but not limited to, 99% or more, more preferably 99.5% or more. (In the case where a plurality of types of diamine components are used, the purity is the value of the diamine component having the highest purity, or the average value of the purities of all diamine components to be used which are determined separately and weighted with the mass ratio of the used components; for example, the purity of the diamine component used is calculated to be 97% when 70 parts by mass of a diamine component having a purity of 100% and 30 parts by mass of a diamine component having a purity of 90% are used). When the purity is less than 98%, the molecular weight of the polyimide precursor may not be sufficiently increased and the obtained polyimide may have low heat resistance. The purity is a value which may be determined by gas chromatography analysis, liquid chromatography analysis, $^1$H-NMR analysis, or the like.

In the polyimide precursor of the present invention, $X_1$ and $X_2$ in the chemical formula (1) are each independently hydrogen, an alkyl group having 1 to 6 carbon atoms, preferably having 1 to 3 carbon atoms, or an alkylsilyl group having 3 to 9 carbon atoms. As for $X_1$ and $X_2$, the types of the functional groups and the introduction ratio of the functional groups may be changed by the production method as described later.

In the case where $X_1$ and $X_2$ are each hydrogen, a polyimide tends to be easily produced therefrom.

Meanwhile, in the case where $X_1$ and $X_2$ are each an alkyl group having 1 to 6 carbon atoms, preferably having 1 to 3 carbon atoms, the polyimide precursor tends to have excellent storage stability. In this case, $X_1$ and $X_2$ are more preferably methyl or ethyl.

Additionally, in the case where $X_1$ and $X_2$ are each an alkylsilyl group having 3 to 9 carbon atoms, the polyimide precursor tends to have excellent solubility. In this case, $X_1$ and $X_2$ are more preferably trimethylsilyl or t-butyldimethylsilyl.

When an alkyl group or an alkylsilyl group is introduced, $X_1$ and $X_2$ may be converted into an alkyl group or an alkylsilyl group in a ratio of 25% or more, preferably 50% or more, more preferably 75% or more, although the introduction ratio of the functional groups is not limited thereto.

According to the chemical structure $X_1$ and $X_2$ have, the polyimide precursors of the present invention may be classified into 1) polyamic acid ($X_1$ and $X_2$ are hydrogen), 2) polyamic acid ester (at least part of $X_1$ and $X_2$ is alkyl group), and 3) 4) polyamic acid silyl ester (at least part of $X_1$ and $X_2$ is alkylsilyl group). Each class of the polyimide precursors of the present invention may be easily produced by the following production methods. However, the method for producing the polyimide precursor of the present invention is not limited to the following production methods.

1) Polyamic Acid

The polyimide precursor of the present invention may be suitably obtained, in the form of a polyimide precursor solution composition, by reacting a tetracarboxylic dianhydride as a tetracarboxylic acid component and a diamine component in a substantially equimolar amount, preferably in a molar ratio of the diamine component to the tetracarboxylic acid component [molar number of the diamine component/molar number of the tetracarboxylic acid component] of 0.90 to 1.10, more preferably 0.95 to 1.05, in a solvent at a relatively low temperature of 120° C. or less, for example, to suppress the imidization.

More specifically, the polyimide precursor may be obtained by dissolving the diamine in an organic solvent, adding the tetracarboxylic dianhydride to the resulting solution gradually while stirring the solution, and then stirring the solution at a temperature of 0° C. to 120° C., preferably 5° C. to 80° C., for 1 hour to 72 hours, although the production method is not limited thereto. When they are reacted at a temperature of 80° C. or more, the molecular weight may vary depending on the temperature history in the polymerization and the imidization may proceed by heat, and therefore the polyimide precursor may not be stably produced. The sequence of the addition of the diamine and the tetracarboxylic dianhydride in the production method as described above is preferred because the molecular weight of the polyimide precursor is apt to increase. Meanwhile, the sequence of the addition of the diamine and the tetracarboxylic dianhydride in the production method as described above may be reversed, and the sequence is preferred because the amount of the precipitate is reduced.

In addition, when the diamine component is excessive in the molar ratio of the tetracarboxylic acid component to the diamine component, a carboxylic acid derivative may be added in an amount which substantially corresponds to the excessive molar number of the diamine component, as necessary, so that the molar ratio of the tetracarboxylic acid component to the diamine component is closer to the substantially equimolar amount. As the carboxylic acid derivative to be used herein, tetracarboxylic acids, which do not substantially increase the viscosity of the polyimide precursor solution, that is, do not substantially involve the molecular chain extension, or tricarboxylic acids and anhydrides thereof, and dicarboxylic acids and anhydrides thereof, which function as an end-stopping agent, and the like are preferred.

2) Polyamic Acid Ester

A diester dicarboxylic acid chloride may be obtained by reacting a tetracarboxylic dianhydride and an arbitrary alcohol to provide a diester dicarboxylic acid, and then reacting the diester dicarboxylic acid and a chlorinating agent (thionyl chloride, oxalyl chloride, and the like). The polyimide precursor may be obtained by stirring the diester dicarboxylic acid chloride and a diamine at a temperature of −20° C. to 120° C., preferably −5° C. to 80° C., for 1 hour to 72 hours. When they are reacted at a temperature of 80° C. or more, the molecular weight may vary depending on the temperature history in the polymerization and the imidization may proceed by heat, and therefore the polyimide precursor may not be stably produced. In addition, the polyimide precursor may also be easily obtained by dehydrating/condensing a diester dicarboxylic acid and a diamine by the use of a phosphorus-based condensing agent, a carbodiimide condensing agent, or the like.

The polyimide precursor obtained by the method is stable, and therefore the polyimide precursor may be subjected to purification, for example, reprecipitation in which a solvent such as water and alcohols is added thereto.

3) Polyamic Acid Silyl Ester (Indirect Method)

A silylated diamine may be obtained by reacting a diamine and a silylating agent in advance. The silylated diamine may be purified by distillation, or the like, as necessary. And then, the polyimide precursor may be obtained by dissolving the silylated diamine in a dehydrated solvent, adding a tetracarboxylic dianhydride to the resulting solution gradually while stirring the solution, and then stirring the solution at a temperature of 0° C. to 120° C., preferably 5° C. to 80° C., for 1 hour to 72 hours. When they are reacted at a temperature of 80° C. or more, the molecular weight may vary depending on the temperature history in the polymerization and the imidization may proceed by heat, and therefore the polyimide precursor may not be stably produced.

As for the silylating agent to be used herein, the use of a silylating agent containing no chlorine is preferred because it is unnecessary to purify the silylated diamine. Examples of the silylating agent containing no chlorine atom include N,O-bis(trimethylsilyl)trifluoroacetamide, N,O-bis(trimethylsilyl)acetamide, and hexamethyldisilazane. Among them, N,O-bis(trimethylsilyl)acetamide, and hexamethyldisilazane are particularly preferred, because they contain no fluorine atom and are inexpensive.

In addition, in the silylation reaction of diamine, an amine catalyst such as pyridine, piperidine and triethylamine may be used so as to accelerate the reaction. The catalyst may be used, as it is, as a catalyst for the polymerization of the polyimide precursor.

4) Polyamic Acid Silyl Ester (Direct Method)

The polyimide precursor may be obtained by mixing a polyamic acid solution obtained by the method 1) and a silylating agent, and then stirring the resulting mixture at a temperature of 0° C. to 120° C., preferably 5° C. to 80° C., for 1 hour to 72 hours. When they are reacted at a temperature of 80° C. or more, the molecular weight may vary depending on the temperature history in the polymerization and the imidization may proceed by heat, and therefore the polyimide precursor may not be stably produced.

As for the silylating agent to be used herein, the use of a silylating agent containing no chlorine is preferred because it is unnecessary to purify the silylated polyamic acid, or the obtained polyimide. Examples of the silylating agent containing no chlorine atom include N,O-bis(trimethylsilyl)trifluoroacetamide, N,O-bis(trimethylsilyl)acetamide, and hexamethyldisilazane. Among them, N,O-bis(trimethylsilyl)acetamide, and hexamethyldisilazane are particularly preferred, because they contain no fluorine atom and are inexpensive.

All of the production methods as described above may be suitably performed in an organic solvent, and as a consequence a varnish of the polyimide precursor of the present invention may be easily obtained.

As the solvent used in the production of the polyimide precursor, for example, aprotic solvents such as N,N-dimethylformamide, N,N-dimethylacetamide, N-methyl-2-pyrrolidone, 1,3-dimethyl-2-imidazolidinone and dimethyl sulfoxide are preferred, and N,N-dimethylacetamide is particularly preferred. However, any solvent may be used without any trouble on the condition that the starting monomer components and the formed polyimide precursor can be dissolved in the solvent, and the structure of the solvent is not limited thereto. Examples of the solvent preferably employed include amide solvents such as N,N-dimethylformamide, N,N-dimethylacetamide and N-methylpyrrolidone;

cyclic ester solvents such as γ-butyrolactone, γ-valerolactone, δ-valerolactone, γ-caprolactone, ε-caprolactone and α-methyl-γ-butyrolactone; carbonate solvents such as ethylene carbonate and propylene carbonate; glycol solvents such as triethylene glycol; phenol solvents such as m-cresol, p-cresol, 3-chlorophenol and 4-chlorophenol; acetophenone, 1,3-dimethyl-2-imidazolidinone, sulfolane, and dimethylsulfoxide. In addition, other common organic solvents, namely, phenol, o-cresol, butyl acetate, ethyl acetate, isobutyl acetate, propyleneglycol methyl acetate, ethyl cellosolve, butyl cellosolve, 2-methyl cellosolve acetate, ethyl cellosolve acetate, butyl cellosolve acetate, tetrahydrofuran, dimethoxyethane, diethoxyethane, dibutyl ether, diethylene glycol dimethyl ether, methyl isobutyl ketone, diisobutyl ketone, cyclopentanone, cyclohexanone, methyl ethyl ketone, acetone, butanol, ethanol, xylene, toluene, chlorobenzene, turpentine, mineral spirits, petroleum naphtha-based solvents, and the like may be used. These solvents may be used in combination of a plurality of types.

In the present invention, although the logarithmic viscosity of the polyimide precursor is not limited thereto, the logarithmic viscosity of the polyimide precursor in a N,N-dimethylacetamide solution at a concentration of 0.5 g/dL at 30° C. may be preferably 0.2 dL/g or more, more preferably 0.3 dL/g or more, particularly preferably 0.4 dL/g or more. When the logarithmic viscosity is 0.2 dL/g or more, the molecular weight of the polyimide precursor is high, and therefore the obtained polyimide may have excellent mechanical strength and heat resistance.

In the present invention, it is preferred that the varnish of the polyimide precursor comprises at least the polyimide precursor of the present invention and a solvent, and the total amount of the tetracarboxylic acid component and the diamine component is 5 mass % or more, preferably 10 mass % or more, more preferably 15 mass % or more, based on the total amount of the solvent, the tetracarboxylic acid component and the diamine component. Additionally, it is generally preferred that the total amount is 60 mass % or less, preferably 50 mass % or less. When the concentration, which is approximate to the concentration of the solid content based on the polyimide precursor, is too low, it may be difficult to control the thickness of the obtained polyimide film in the production of the polyimide film, for example.

As the solvent used for the varnish of the polyimide precursor of the present invention, any solvent may be used without any trouble on the condition that the polyimide precursor can be dissolved in the solvent, and the structure of the solvent is not particularly limited. Examples of the solvent preferably employed include amide solvents such as N,N-dimethylformamide, N,N-dimethylacetamide and N-methyl-2-pyrrolidone; cyclic ester solvents such as γ-butyrolactone, γ-valerolactone, δ-valerolactone, γ-caprolactone, ε-caprolactone and α-methyl-γ-butyrolactone; carbonate solvents such as ethylene carbonate and propylene carbonate; glycol solvents such as triethylene glycol; phenol solvents such as m-cresol, p-cresol, 3-chlorophenol and 4-chlorophenol; acetophenone, 1,3-dimethyl-2-imidazolidinone, sulfolane, and dimethylsulfoxide. In addition, other common organic solvents, namely, phenol, o-cresol, butyl acetate, ethyl acetate, isobutyl acetate, propyleneglycol methyl acetate, ethyl cellosolve, butyl cellosolve, 2-methyl cellosolve acetate, ethyl cellosolve acetate, butyl cellosolve acetate, tetrahydrofuran, dimethoxyethane, diethoxyethane, dibutyl ether, diethylene glycol dimethyl ether, methyl isobutyl ketone, diisobutyl ketone, cyclopentanone, cyclohexanone, methyl ethyl ketone, acetone, butanol, ethanol, xylene, toluene, chlorobenzene, turpentine, mineral spirits, petroleum naphtha-based solvents, and the like may be used. Additionally, these may be used in combination of a plurality of types.

In the present invention, although the viscosity (rotational viscosity) of the varnish of the polyimide precursor is not limited thereto, the rotational viscosity, which is measured with an E-type rotational viscometer at a temperature of 25° C. and at a shearing speed of 20 sec$^{-1}$, may be preferably 0.01 to 1000 Pa·sec, more preferably 0.1 to 100 Pa·sec. In addition, thixotropy may be imparted, as necessary. When the viscosity is within the above-mentioned range, the varnish is easy to handle during the coating or the film formation, and the varnish is less repelled and has excellent leveling property, and therefore a good film may be obtained.

As necessary, a chemical imidizing agent (an acid anhydride such as acetic anhydride, and an amine compound such as pyridine and isoquinoline), an anti-oxidizing agent, a filler, a dye, a pigment, a coupling agent such as a silane coupling agent, a primer, a flame retardant, a defoaming agent, a leveling agent, a rheology control agent (flow-promoting agent), a releasing agent, and the like may be added to the varnish of the polyimide precursor of the present invention.

The polyimide of the present invention is characterized in that the polyimide comprises a repeating unit represented by the chemical formula (4), and comprises at least one type of repeating unit represented by the chemical formula (4) in which the "B" is a group represented by any one of the chemical formulas (5) and (6).

In other words, the polyimide of the present invention is a polyimide obtained from the tetracarboxylic acid component and the diamine component to be used for obtaining the polyimide precursor of the present invention as described above. The polyimide of the present invention may be suitably produced by the dehydration/ring closure reaction (imidization reaction) of the polyimide precursor of the present invention as described above. The imidization method is not particularly limited, and any known thermal imidization or chemical imidization method may be suitably applied. Preferred examples of the form of the obtained polyimide include a film, a laminate of a polyimide film and another substrate, a coating film, a powder, a bead, a molded article, a foamed article, and a varnish.

The chemical formula (4) of the polyimide of the present invention corresponds to the chemical formula (1) of the polyimide precursor of the present invention.

In the present invention, although the logarithmic viscosity of the polyimide is not limited thereto, the logarithmic viscosity of the polyimide in a N,N-dimethylacetamide solution at a concentration of 0.5 g/dL at 30° C. may be preferably 0.2 dL/g or more, more preferably 0.3 dL/g or more, particularly preferably 0.4 dL/g or more. When the logarithmic viscosity is 0.2 dL/g or more, the obtained polyimide may have excellent mechanical strength and heat resistance.

In the present invention, it is preferred that the varnish of the polyimide comprises at least the polyimide of the present invention and a solvent, and the amount of the polyimide is 5 mass % or more, preferably 10 mass % or more, more preferably 15 mass % or more, particularly preferably 20 mass % or more, based on the total amount of the solvent and the polyimide. When the concentration is too low, it may be difficult to control the thickness of the obtained polyimide film in the production of the polyimide film, for example.

As the solvent used for the varnish of the polyimide of the present invention, any solvent may be used without any trouble on the condition that the polyimide can be dissolved in the solvent, and the structure of the solvent is not particularly limited. The solvent used for the varnish of the polyimide precursor of the present invention as described above may be used likewise as the solvent.

In the present invention, although the viscosity (rotational viscosity) of the varnish of the polyimide is not limited thereto, the rotational viscosity, which is measured with an E-type rotational viscometer at a temperature of 25° C. and at a shearing speed of 20 sec$^{-1}$, may be preferably 0.01 to 1000 Pa·sec, more preferably 0.1 to 100 Pa·sec. In addition, thixotropy may be imparted, as necessary. When the viscosity is within the above-mentioned range, the varnish is easy to handle during the coating or the film formation, and the varnish is less repelled and has excellent leveling property, and therefore a good film may be obtained.

As necessary, an anti-oxidizing agent, a filler, a dye, a pigment, a coupling agent such as a silane coupling agent, a primer, a flame retardant, a defoaming agent, a leveling agent, a rheology control agent (flow-promoting agent), a releasing agent, and the like may be added to the varnish of the polyimide of the present invention.

As necessary, an inorganic particle such as silica may be mixed into the polyimide obtained from the polyimide precursor of the present invention and the polyimide of the present invention. Examples of the mixing method include, but not limited to, a method in which an inorganic particle is dispersed in a polymerization solvent, and then a polyimide precursor is polymerized in the solvent; a method in which a polyimide precursor solution and an inorganic particle are mixed; a method in which a polyimide precursor solution and an inorganic particle dispersion are mixed; a method in which an inorganic particle is mixed into a polyimide solution; and a method in which an inorganic particle dispersion is mixed into a polyimide solution. An inorganic particle-containing polyimide may be obtained by imidizing a polyimide precursor in an inorganic particle-dispersed polyimide precursor solution in which an inorganic particle is dispersed by any one of these methods; or by mixing a polyimide solution with an inorganic particle or an inorganic particle-dispersed solution, and then heating and drying the mixture to remove the solvent therefrom.

The polyimide obtained from the polyimide precursor of the present invention and the polyimide of the present invention may have preferably, but not limited to, a coefficient of linear thermal expansion from 50° C. to 200° C. of 60 ppm/K or less, more preferably 55 ppm/K or less, more preferably 50 ppm/K or less, or less than 50 ppm/K, more preferably 47 ppm/K or less, more preferably 45 ppm/K or less, particularly preferably 42 ppm/K or less, when the polyimide is formed into a film, and have a very low coefficient of linear thermal expansion. When the coefficient of linear thermal expansion is great, the difference in the coefficient of linear thermal expansion between the polyimide and a conductive material such as a metal is great, and therefore a trouble such as an increase in warpage may occur during the formation of a circuit board.

The polyimide obtained from the polyimide precursor of the present invention and the polyimide of the present invention may have preferably, but not limited to, a total light transmittance (average light transmittance at wavelengths of 380 nm to 780 nm) of 78% or more, more preferably 80% or more, more preferably 82% or more, particularly preferably 86% or more, in the form of a film having a thickness of 10 µm, and have excellent optical transparency. When the total light transmittance is low, the light source must be bright, and therefore a problem of more energy required, or the like may arise in the case where the polyimide is used in display application, or the like.

As for a film formed of the polyimide obtained from the polyimide precursor of the present invention and the polyimide of the present invention, the thickness of the film is preferably 1 µm to 250 µm, more preferably 1 µm to 150 µm, more preferably 1 µm to 50 µm, particularly preferably 1 µm to 30 µm, although it varies depending on the intended use. When the polyimide film is too thick, the light transmittance may be low in the case where the polyimide film is used in applications where light passes through the polyimide film.

The polyimide obtained from the polyimide precursor of the present invention and the polyimide of the present invention may have preferably, but not limited to, a 5% weight loss temperature of more than 480° C., more preferably 490° C. or more, more preferably 500° C. or more, particularly preferably 505° C. or more. In the case where a gas barrier film, or the like is formed on the polyimide for the formation of a transistor on the polyimide, or the like, swelling may occur between the polyimide and the barrier film due to outgassing associated with the decomposition of the polyimide, when the polyimide has a low heat resistance.

The polyimide obtained from the polyimide precursor of the present invention and the polyimide of the present invention has excellent properties such as high transparency, bending resistance and high heat resistance, and has a very low coefficient of linear thermal expansion, and therefore the polyimide may be suitably used in the applications of transparent substrate for display, transparent substrate for touch panel, or substrate for solar battery.

One example of a method for producing a polyimide film/base laminate, or a polyimide film with the use of the polyimide precursor of the present invention will be described hereinafter. However, the method is not limited to the following method.

For example, a varnish of the polyimide precursor of the present invention is flow-cast on a base of ceramic (glass, silicon, or alumina), metal (copper, aluminum, or stainless steel), heat-resistant plastic film (polyimide), or the like, and dried at a temperature of 20° C. to 180° C., preferably 20° C. to 150° C., by the use of hot air or infrared ray in a vacuum, in an inert gas such as nitrogen, or in air. And then, the obtained polyimide precursor film is heated and imidized at a temperature of 200° C. to 500° C., more preferably about 250° C. to about 450° C., by the use of hot air or infrared ray in a vacuum, in an inert gas such as nitrogen, or in air, wherein the polyimide precursor film is on the base, or alternatively, the polyimide precursor film is peeled from the base and fixed at the edges, to provide a polyimide film/base laminate, or a polyimide film. The thermal imidization is preferably performed in a vacuum or in an inert gas so as to prevent oxidation and degradation of the obtained polyimide film. The thermal imidization may be performed in air if the thermal imidization temperature is not too high. At this point, the thickness of the polyimide film (the polyimide film layer, in the case of a polyimide film/base laminate) is preferably 1 µm to 250 µm, more preferably 1 µm to 150 µm, in view of the transportability in the subsequent steps.

The imidization reaction of the polyimide precursor may also be performed by chemical treatment in which the polyimide precursor is immersed in a solution containing a dehydrating/cyclizing agent such as acetic anhydride in the presence of a tertiary amine such as pyridine and triethylamine, instead of the thermal imidization by heat treatment as described above. Alternatively, a partially-imidized polyimide precursor may be prepared by adding the dehydrating/ cyclizing agent to the varnish of the polyimide precursor in advance and stirring the varnish, and then flow-casting the varnish on a base and drying it. A polyimide film/base laminate, or a polyimide film may be obtained by further heating the partially-imidized polyimide precursor as described above.

A flexible conductive substrate may be obtained by forming a conductive layer on one surface or both surfaces of the polyimide film/base laminate or the polyimide film thus obtained.

A flexible conductive substrate may be obtained by the following methods, for example. As for the first method, the polyimide film is not peeled from the base in the "polyimide film/base" laminate, and a conductive layer of a conductive material (metal or metal oxide, conductive organic material, conductive carbon, or the like) is formed on the surface of the polyimide film by sputtering, vapor deposition, printing, or the like, to provide a "conductive layer/polyimide film/base" conductive laminate. And then, as necessary, the "conductive layer/polyimide film" laminate is peeled from the base, to provide a transparent and flexible conductive substrate which consists of the "conductive layer/polyimide film" laminate.

As for the second method, the polyimide film is peeled from the base in the "polyimide film/base" laminate to obtain the polyimide film, and then a conductive layer of a conductive material (metal or metal oxide, conductive organic material, conductive carbon, or the like) is formed on the surface of the polyimide film in the same way as in the first method, to provide a transparent and flexible conductive substrate which consists of the "conductive layer/polyimide film" laminate, or the "conductive layer/polyimide film" laminate/conductive layer.

In the first and the second methods, a gas barrier layer against water vapor, oxygen, or the like, and an inorganic layer such as a light-controlling layer may be formed on the surface of the polyimide film by sputtering, vapor deposition, gel-sol process, or the like, as necessary, before the conductive layer is formed.

In addition, a circuit may be suitably formed on the conductive layer by photolithography process, various printing processes, ink-jet process, or the like.

The substrate of the present invention comprises a circuit of a conductive layer on a surface of a polyimide film formed of the polyimide of the present invention, optionally with a gas barrier layer or an inorganic layer therebetween, as necessary. The substrate is flexible, and has high transparency and excellent bending resistance and heat resistance, and also has a very low coefficient of linear thermal expansion and excellent solvent resistance, and therefore a fine circuit may be easily formed thereon. Accordingly, the substrate may be suitably used as a substrate for display, touch panel, or solar battery.

More specifically, a flexible thin-film transistor is produced by further forming a transistor (inorganic transistor, or organic transistor) on the substrate by vapor deposition, various printing processes, ink-jet process, or the like, and is suitably used as a liquid crystal device for display device, an EL device, or a photoelectric device.

Examples of the method for synthesizing (4arH,8acH)-decahydro-1t,4t:5c,8c-dimethanonaphthalene-2 t,3t,6c,7c-tetracarboxylic acid, or the like, which is the tetracarboxylic acid component of the present invention, include, but not limited to, a method described in Non Patent Literature 1 as described above.

Examples of the method for synthesizing (4arH,8acH)-decahydro-1t,4t:5c,8c-dimethanonaphthalene-2c,3c,6c,7c-tetracarboxylic acid, or the like, which is the stereoisomer thereof, include, but not limited to, a method described in Non Patent Literature 2 as described above.

EXAMPLES

The present invention will be further described hereinafter with reference to Examples and Comparative Examples. However, the present invention is not limited to the following Examples.

In each of the following Examples, the evaluations were conducted by the following methods.

<Evaluation of Varnish of Polyimide Precursor>
[Logarithmic Viscosity]

A polyimide precursor solution at a concentration of 0.5 g/dL was prepared by diluting the varnish with the solvent used in the polymerization, and the logarithmic viscosity was determined by the measurement of the viscosity at 30° C. using an Ubbelohde viscometer.

<Evaluation of Polyimide Film>
[Film Formation]

The film, which was peeled from the glass, was evaluated by visual observation on the following criteria.

Film having no cracks therein: ○
Film having a large crack therein: Δ
Film having small cracks therein: x

[Total Light Transmittance]

The total light transmittance (average light transmittance at 380 nm to 780 nm) of the polyimide film having a thickness of 10 μm was measured using a MCPD-300 made by Otsuka Electronics Co., Ltd.

[Modulus of Elasticity, Elongation at Break, Breaking Strength]

The polyimide film having a thickness of 10 μm was cut to the dumbbell shape of IEC450 standard, which was used as a test piece, and the initial modulus of elasticity, the elongation at break, and the breaking strength were measured at a distance between chucks of 30 mm and a tensile speed of 2 mm/min using a TENSILON made by Orientec Co., Ltd.

[Coefficient of Linear Thermal Expansion (CTE)]

The polyimide film having a thickness of 10 μm was cut to a rectangle having a width of 4 mm, which was used as a test piece, and the test piece was heated to 500° C. at a distance between chucks of 15 mm, a load of 2 g and a temperature-increasing rate of 20° C./min using a TMA/SS6100 made by SII Nanotechnology Inc. The coefficient of linear thermal expansion from 50° C. to 200° C. was determined from the obtained TMA curve.

[5% Weight Loss Temperature]

The polyimide film having a thickness of 10 μm was used as a test piece, and the test piece was heated from 25° C. to 600° C. at a temperature-increasing rate of 10° C./min in a flow of nitrogen using a thermogravimetric analyzer (Q5000IR) made by TA Instruments Inc. The 5% weight loss temperature was determined from the obtained weight curve.

The abbreviations, purities, etc. of the raw materials used in each of the following Examples are as follows.

[Diamine Component]
DABAN: 4,4'-diaminobenzanilide [purity: 99.90% (GC analysis)]
TFMB: 2,2'-bis(trifluoromethyl)benzidine [purity: 99.83% (GC analysis)]
PPD: p-phenylenediamine [purity: 99.9% (GC analysis)]
4-APTP: N,N'-bis(4-aminophenyl)terephthalamide [purity: 99.95% (GC analysis)]

AZDA: 2,4-bis(4-aminoanilino)-6-anilino-1,3,5-triazine [purity: 99.9% (GC analysis)]
APBP: biphenyl-4,4'-dicarboxylic acid bis(4-aminophenyl) ester
ODA: 4,4'-oxydianiline [purity: 99.9% (GC analysis)]
FDA: 9,9-bis(4-aminophenyl)fluorene
BAPB: 4,4'-bis(4-aminophenoxy)biphenyl
TPE-R: 1,3-bis(4-aminophenoxy)benzene
TPE-Q: 1,4-bis(4-aminophenoxy)benzene
m-TD: m-tolidine [purity: 99.84% (GC analysis)]
[Tetracarboxylic Acid Component]
DNDAxx: (4arH,8acH)-decahydro-1t,4t:5c,8c-dimethanonaphthalene-2t,3t,6c,7c-tetracarboxylic dianhydride [purity as DNDAxx: 99.2% (GC analysis)]
DNDAdx: (4arH,8acH)-decahydro-1t,4t:5c,8c-dimethanonaphthalene-2c,3c,6c,7c-tetracarboxylic dianhydride [purity as DNDAdx: 99.7% (GC analysis)]
CpODA: norbornane-2-spiro-α-cyclopentanone-α'-spiro-2"-norbornane-5,5",6,6"-tetracarboxylic dianhydride
[Solvent]
DMAc: N,N-dimethylacetamide
NMP: N-methyl-2-pyrrolidone

[Purity of Solvent]
GC analysis:
  Retention time of the main component (min) 14.28
  Area of the main component (%) 99.9929
  Peak area of the impurity having a shorter retention time (%) 0.0000
  Peak area of the impurity having a longer retention time (%) 0.0071
Involatile component (mass %)<0.001
Light transmittance (optical path length 1 cm, 400 nm):
  Light transmittance before heating-reflux (%) 92
  Light transmittance after heating-reflux for 3 hours in a nitrogen atmosphere (%) 92
Metal Content:
  Na (ppb) 150
  Fe (ppb)<2
  Cu (ppb)<2
  Mo (ppb)<1

The structural formulas of the tetracarboxylic acid components and the diamine components used in Examples and Comparative Examples are shown in Table 1.

TABLE 1

Tetracarboxylic dianhydride

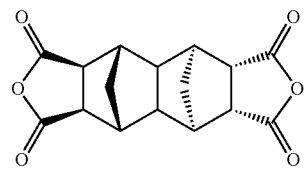

DNDAxx

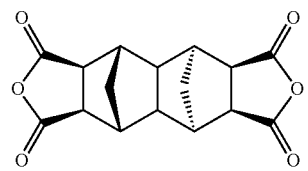

DNDAdx

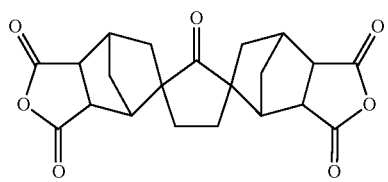

CpODA

Diamine

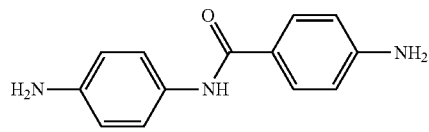

DABAN

PPD

TABLE 1-continued
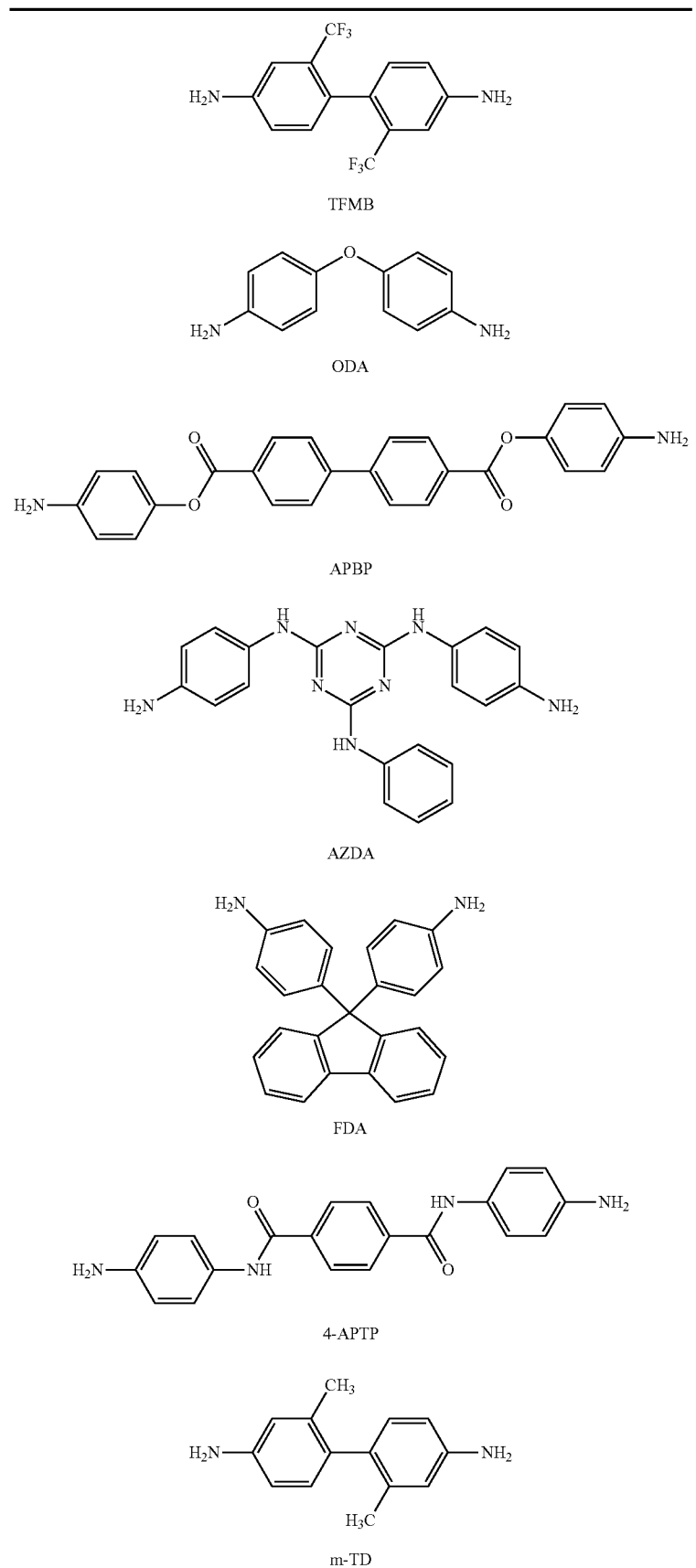

TABLE 1-continued

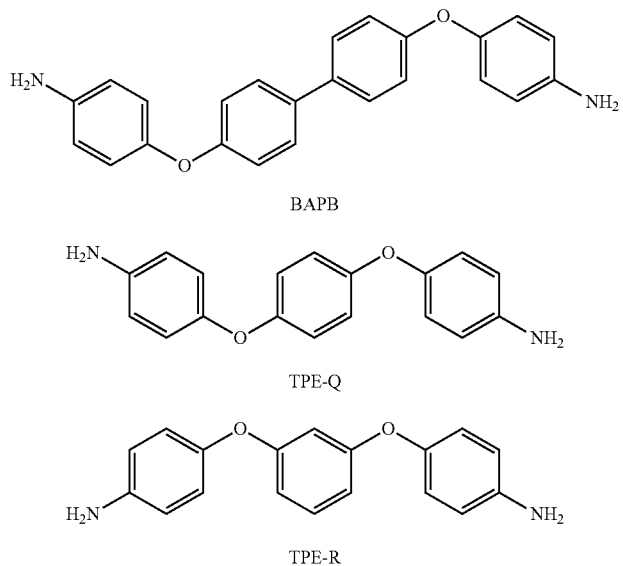

BAPB

TPE-Q

TPE-R

Example 1

2.27 g (10 mmol) of DABAN was placed in a reaction vessel, which was purged with nitrogen gas, and 21.18 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution. The logarithmic viscosity of the obtained polyimide precursor was 0.6 dL/g.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-1.

Example 2

4.24 g (10 mmol) of APBP was placed in a reaction vessel, which was purged with nitrogen gas, and 29.07 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-1.

Example 3

3.84 g (10 mmol) of AZDA was placed in a reaction vessel, which was purged with nitrogen gas, and 27.47 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution. The logarithmic viscosity of the obtained polyimide precursor was 0.6 dL/g.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-1.

Example 4

2.27 g (10 mmol) of DABAN was placed in a reaction vessel, which was purged with nitrogen gas, and 21.18 g of N,N-dimethylacetamide was added thereto such that the total mass of loading monomers (total mass of the diamine component and the carboxylic acid component) was 20 mass %, and then the mixture was stirred at room temperature for 1 hour. 2.12 g (7 mmol) of DNDAxx and 0.91 g (3 mmol) of DNDAdx were gradually added to the resulting solution. The mixture was stirred at room temperature for 12 hours, to provide a homogeneous and viscous polyimide precursor solution. The logarithmic viscosity of the obtained polyimide precursor was 0.5 dL/g.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-1.

Example 5

2.27 g (10 mmol) of DABAN was placed in a reaction vessel, which was purged with nitrogen gas, and 21.18 g of N,N-dimethylacetamide was added thereto such that the total mass of loading monomers (total mass of the diamine component and the carboxylic acid component) was 20 mass %, and then the mixture was stirred at room temperature for 1 hour. 1.51 g (5 mmol) of DNDAxx and 1.51 g (5 mmol) of DNDAdx were gradually added to the resulting solution. The mixture was stirred at room temperature for 12 hours, to provide a homogeneous and viscous polyimide precursor solution. The logarithmic viscosity of the obtained polyimide precursor was 0.5 dL/g.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-1.

Example 6

1.08 g (10 mmol) of PPD was placed in a reaction vessel, which was purged with nitrogen gas, and 16.42 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution.

The polyimide precursor solution, which was filtered through a PTFE membrane filter, was applied on a glass substrate, and then the polyimide precursor was thermally imidized by heating the polyimide precursor solution on the glass substrate from room temperature to 480° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-1.

Example 7

3.20 g (10 mmol) of TFMB was placed in a reaction vessel, which was purged with nitrogen gas, and 24.90 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution. The logarithmic viscosity of the obtained polyimide precursor was 0.4 dL/g.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-1.

Example 8

3.46 g (10 mmol) of 4-APTP was placed in a reaction vessel, which was purged with nitrogen gas, and 25.95 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution. The logarithmic viscosity of the obtained polyimide precursor was 1.2 dL/g.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-1.

Example 9

1.59 g (7 mmol) of DABAN and 0.96 g (3 mmol) of TFMB were placed in a reaction vessel, which was purged with nitrogen gas, and 22.30 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution. The logarithmic viscosity of the obtained polyimide precursor was 0.5 dL/g.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-1.

Example 10

1.14 g (5 mmol) of DABAN and 1.60 g (5 mmol) of TFMB were placed in a reaction vessel, which was purged with nitrogen gas, and 23.04 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution. The logarithmic viscosity of the obtained polyimide precursor was 0.6 dL/g.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-1.

Example 11

0.68 g (3 mmol) of DABAN and 2.24 g (7 mmol) of TFMB were placed in a reaction vessel, which was purged with nitrogen gas, and 23.79 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution. The logarithmic viscosity of the obtained polyimide precursor was 0.5 dL/g.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-2.

Example 12

1.14 g (5 mmol) of DABAN and 0.54 g (5 mmol) of PPD were placed in a reaction vessel, which was purged with nitrogen gas, and 18.80 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution. The logarithmic viscosity of the obtained polyimide precursor was 0.7 dL/g.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-2.

Example 13

1.14 g (5 mmol) of DABAN, 0.43 g (4 mmol) of PPD and 0.20 g (1 mmol) of ODA were placed in a reaction vessel, which was purged with nitrogen gas, and 19.16 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution. The logarithmic viscosity of the obtained polyimide precursor was 0.6 dL/g.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-2.

Example 14

0.91 g (4 mmol) of DABAN, 1.28 g (4 mmol) of TFMB and 0.22 g (2 mmol) of PPD were placed in a reaction vessel, which was purged with nitrogen gas, and 21.72 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution. The logarithmic viscosity of the obtained polyimide precursor was 0.5 dL/g.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-2.

Example 15

2.27 g (10 mmol) of DABAN was placed in a reaction vessel, which was purged with nitrogen gas, and 22.17 g of N,N-dimethylacetamide was added thereto such that the total mass of loading monomers (total mass of the diamine component and the carboxylic acid component) was 20 mass %, and then the mixture was stirred at room temperature for 1 hour. 2.12 g (7 mmol) of DNDAxx and 1.15 g (3 mmol) of CpODA were gradually added to the resulting solution. The mixture was stirred at room temperature for 12 hours, to provide a homogeneous and viscous polyimide precursor solution. The logarithmic viscosity of the obtained polyimide precursor was 0.5 dL/g.

The polyimide precursor solution, which was filtered through a PTFE membrane filter, was applied on a glass substrate, and then the polyimide precursor was thermally imidized by heating the polyimide precursor solution on the glass substrate from room temperature to 400° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-2.

Example 16

0.91 g (4 mmol) of DABAN, 0.64 g (2 mmol) of TFMB and 0.43 g (4 mmol) of PPD were placed in a reaction vessel, which was purged with nitrogen gas, and 20.00 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-2.

Example 17

0.91 g (4 mmol) of DABAN, 0.54 g (5 mmol) of PPD and 0.20 g (1 mmol) of ODA were placed in a reaction vessel, which was purged with nitrogen gas, and 18.68 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-2.

Example 18

0.91 g (4 mmol) of DABAN, 0.32 g (1 mmol) of TFMB and 0.54 g (5 mmol) of PPD were placed in a reaction vessel, which was purged with nitrogen gas, and 19.16 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-2.

Example 19

1.02 g (4.5 mmol) of DABAN, 0.16 g (0.5 mmol) of TFMB and 0.54 g (5 mmol) of PPD were placed in a reaction vessel, which was purged with nitrogen gas, and 18.96 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-2.

Example 20

0.91 g (4 mmol) of DABAN, 0.54 g (5 mmol) of PPD and 0.35 g (1 mmol) of FDA were placed in a reaction vessel, which was purged with nitrogen gas, and 19.28 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-2.

Example 21

0.91 g (4 mmol) of DABAN, 0.54 g (5 mmol) of PPD and 0.37 g (1 mmol) of BAPB were placed in a reaction vessel, which was purged with nitrogen gas, and 19.36 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-3.

Example 22

1.59 g (7 mmol) of DABAN, 0.22 g (2 mmol) of PPD and 0.37 g (1 mmol) of BAPB were placed in a reaction vessel, which was purged with nitrogen gas, and 20.80 g of N-methyl-2-pyrrolidone was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution.

The polyimide precursor solution, which was filtered through a PTFE membrane filter, was applied on a glass substrate, and then the polyimide precursor was thermally imidized by heating the polyimide precursor solution on the glass substrate from room temperature to 440° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-3.

Example 23

0.45 g (2 mmol) of DABAN, 0.76 g (7 mmol) of PPD and 0.37 g (1 mmol) of BAPB were placed in a reaction vessel, which was purged with nitrogen gas, and 19.36 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-3.

Example 24

0.91 g (4 mmol) of DABAN, 0.43 g (4 mmol) of PPD and 0.74 g (2 mmol) of BAPB were placed in a reaction vessel, which was purged with nitrogen gas, and 20.40 g of N-methyl-2-pyrrolidone was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution.

The polyimide precursor solution, which was filtered through a PTFE membrane filter, was applied on a glass substrate, and then the polyimide precursor was thermally imidized by heating the polyimide precursor solution on the glass substrate from room temperature to 440° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-3.

Example 25

0.68 g (3 mmol) of DABAN, 0.43 g (4 mmol) of PPD and 1.11 g (3 mmol) of BAPB were placed in a reaction vessel, which was purged with nitrogen gas, and 20.96 g of N-methyl-2-pyrrolidone was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution.

The polyimide precursor solution, which was filtered through a PTFE membrane filter, was applied on a glass substrate, and then the polyimide precursor was thermally imidized by heating the polyimide precursor solution on the glass substrate from room temperature to 440° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-3.

Example 26

1.59 g (7 mmol) of DABAN and 1.11 g (3 mmol) of BAPB were placed in a reaction vessel, which was purged with nitrogen gas, and 22.88 g of N-methyl-2-pyrrolidone was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution.

The polyimide precursor solution, which was filtered through a PTFE membrane filter, was applied on a glass substrate, and then the polyimide precursor was thermally imidized by heating the polyimide precursor solution on the glass substrate from room temperature to 440° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-3.

Example 27

0.91 g (4 mmol) of DABAN, 0.54 g (5 mmol) of PPD and 0.29 g (1 mmol) of TPE-R were placed in a reaction vessel, which was purged with nitrogen gas, and 19.04 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-3.

Example 28

0.91 g (4 mmol) of DABAN, 0.54 g (5 mmol) of PPD and 0.29 g (1 mmol) of TPE-Q were placed in a reaction vessel, which was purged with nitrogen gas, and 19.04 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 µm.

The results of the measurements of the properties of the polyimide film are shown in Table 2-3.

Example 29

0.91 g (4 mmol) of DABAN, 0.54 g (5 mmol) of PPD and 0.21 g (1 mmol) of m-TD were placed in a reaction vessel, which was purged with nitrogen gas, and 18.72 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 µm.

The results of the measurements of the properties of the polyimide film are shown in Table 2-3.

Comparative Example 1

2.27 g (10 mmol) of DABAN was placed in a reaction vessel, which was purged with nitrogen gas, and 21.16 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAdx was gradually added to the resulting solution. The mixture was stirred at room temperature for 12 hours, to provide a homogeneous and viscous polyimide precursor solution. The logarithmic viscosity of the obtained polyimide precursor was 0.4 dL/g.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), but small cracks appeared in a polyimide film and a polyimide film could not be obtained.

Comparative Example 2

4.24 g (10 mmol) of APBP was placed in a reaction vessel, which was purged with nitrogen gas, and 29.07 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAdx was gradually added to the resulting solution. The mixture was stirred at room temperature for 12 hours, to provide a homogeneous and viscous polyimide precursor solution. The logarithmic viscosity of the obtained polyimide precursor was 1.2 dL/g.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 µm.

The results of the measurements of the properties of the polyimide film are shown in Table 2-4.

Comparative Example 3

3.84 g (10 mmol) of AZDA was placed in a reaction vessel, which was purged with nitrogen gas, and 27.47 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAdx was gradually added to the resulting solution. The mixture was stirred at room temperature for 12 hours, to provide a homogeneous and viscous polyimide precursor solution. The logarithmic viscosity of the obtained polyimide precursor was 0.8 dL/g.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 µm.

The results of the measurements of the properties of the polyimide film are shown in Table 2-4.

Comparative Example 4

3.46 g (10 mmol) of 4-APTP was placed in a reaction vessel, which was purged with nitrogen gas, and 25.95 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAdx was gradually added to the resulting solution. The mixture was stirred at room temperature for 12 hours, to provide a homogeneous and viscous polyimide precursor solution. The logarithmic viscosity of the obtained polyimide precursor was 0.2 dL/g.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), but small cracks appeared in a polyimide film and a polyimide film could not be obtained.

Comparative Example 5

1.08 g (10 mmol) of PPD was placed in a reaction vessel, which was purged with nitrogen gas, and 16.42 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAdx was gradually added to the resulting solution. The mixture was stirred at room temperature for 12 hours, to provide a homogeneous and viscous polyimide precursor solution.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), but small cracks appeared in a polyimide film and a polyimide film could not be obtained.

Comparative Example 6

3.20 g (10 mmol) of TFMB was placed in a reaction vessel, which was purged with nitrogen gas, and 24.90 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAdx was gradually added to the resulting solution. The mixture was stirred at room temperature for 12 hours, to provide a homogeneous and viscous polyimide precursor solution. The logarithmic viscosity of the obtained polyimide precursor was 0.1 dL/g.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), but small cracks appeared in a polyimide film and a polyimide film could not be obtained.

Comparative Example 7

1.59 g (7 mmol) of DABAN and 0.32 g (3 mmol) of PPD were placed in a reaction vessel, which was purged with nitrogen gas, and 19.75 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAdx was gradually added to the resulting solution. The mixture was stirred at room temperature for 12 hours, to provide a homogeneous and viscous polyimide precursor solution. The logarithmic viscosity of the obtained polyimide precursor was 0.3 dL/g.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), but small cracks appeared in a polyimide film and a polyimide film could not be obtained.

Comparative Example 8

2.97 g (7 mmol) of APBP and 0.32 g (3 mmol) of PPD were placed in a reaction vessel, which was purged with nitrogen gas, and 25.27 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAdx was gradually added to the resulting solution. The mixture was stirred at room temperature for 12 hours, to provide a homogeneous and viscous polyimide precursor solution. The logarithmic viscosity of the obtained polyimide precursor was 1.0 dL/g.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. A large crack appeared in the polyimide film. Subsequently, the obtained polyimide film/glass laminate was immersed in water, and then the polyimide film was peeled from the glass and dried, to provide a polyimide film having a thickness of 10 μm.

The results of the measurements of the properties of the polyimide precursor solution are shown in Table 2-4.

Comparative Example 9

2.00 g (10 mmol) of ODA was placed in a reaction vessel, which was purged with nitrogen gas, and 20.08 g of N,N-dimethylacetamide was added thereto such that the total mass of loading monomers (total mass of the diamine component and the carboxylic acid component) was 20 mass %, and then the mixture was stirred at room temperature for 1 hour. 3.02 g (10 mmol) of DNDAxx was gradually added to the resulting solution. The mixture was stirred at room temperature for 12 hours, to provide a homogeneous and viscous polyimide precursor solution. The logarithmic viscosity of the obtained polyimide precursor was 0.6 dL/g.

The polyimide precursor solution, which was filtered through a PTFE membrane filter, was applied on a glass substrate, and then the polyimide precursor was thermally imidized by heating the polyimide precursor solution on the glass substrate from room temperature to 430° C. in a nitrogen atmosphere (oxygen concentration: 200 ppm or less), to provide a colorless and transparent polyimide film/glass laminate. Subsequently, the obtained polyimide film/glass laminate was immersed in water, and then the polyimide film was peeled from the glass and dried, to provide a polyimide film having a thickness of 10 μm.

The results of the measurements of the properties of the polyimide film are shown in Table 2-4.

TABLE 2-1

| Polyimide precursor | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Tetracarboxylic acid component (mmol) | DNDAxx | 10 | 10 | 10 | 7 | 5 | 10 | 10 | 10 | 10 | 10 |
| | DNDAdx | | | | 3 | 5 | | | | | |
| | CpODA | | | | | | | | | | |
| Diamine component (mmol) | PPD | | | | | | 10 | | | | |
| | TFMB | | | | | | | 10 | | 3 | 5 |
| | DABAN | 10 | | | 10 | 10 | | | | 7 | 5 |
| | APBP | | 10 | | | | | | | | |
| | AZDA | | | 10 | | | | | | | |
| | 4-APTP | | | | | | | | 10 | | |
| | ODA | | | | | | | | | | |
| | FDA | | | | | | | | | | |
| | m-TD | | | | | | | | | | |
| | BAPB | | | | | | | | | | |
| | TPE-R | | | | | | | | | | |
| | TPE-Q | | | | | | | | | | |
| Polyimide film | | | | | | | | | | | |
| Film formation | | ○ | ○ | ○ | ○ | ○ | ○ | ○ | ○ | ○ | ○ |
| Coefficient of linear thermal expansion (ppm/K) | | 40 | 21 | 44 | 44 | 50 | 44 | 46 | 22 | 41 | 43 |
| Modulus of elasticity (GPa) | | 3.9 | 3.9 | 3.3 | 3.3 | 3.1 | 3.3 | 3.8 | 5.8 | 3.6 | 3.7 |
| Elongation at break (%) | | 13 | 6 | 8 | 10 | 8 | 2 | 7 | 4 | 13 | 8 |
| Breaking strength (MPa) | | 125 | 126 | 124 | 102 | 92 | 41 | 118 | 133 | 128 | 115 |
| 5% weight loss temperature (°C.) | | 521 | 492 | 487 | 514 | 512 | 516 | 503 | 515 | 506 | 505 |
| Total light transmittance (%) | | 85 | 81 | 86 | 86 | 86 | 82 | 91 | 79 | 86 | 89 |

TABLE 2-2

| Polyimide precursor | | Example 11 | Example 12 | Example 13 | Example 14 | Example 15 | Example 16 | Example 17 | Example 18 | Example 19 | Example 20 |
|---|---|---|---|---|---|---|---|---|---|---|---|
| Tetracarboxylic acid component (mmol) | DNDAxx | 10 | 10 | 10 | 10 | 7 | 10 | 10 | 10 | 10 | 10 |
| | DNDAdx | | | | | | | | | | |
| | CpODA | | | | | 3 | | | | | |
| Diamine component (mmol) | PPD | | 5 | 4 | 2 | | 4 | 5 | 5 | 5 | 5 |
| | TFMB | 7 | | | 4 | | 2 | | 1 | 0.5 | |
| | DABAN | 3 | 5 | 5 | 4 | 10 | 4 | 4 | 4 | 4.5 | 4 |
| | APBP | | | | | | | | | | |
| | AZDA | | | | | | | | | | |
| | 4-APTP | | | | | | | | | | |
| | ODA | | | | 1 | | | 1 | | | |
| | FDA | | | | | | | | | | 1 |
| | m-TD | | | | | | | | | | |
| | BAPB | | | | | | | | | | |
| | TPE-R | | | | | | | | | | |
| | TPE-Q | | | | | | | | | | |
| Polyimide film | | | | | | | | | | | |
| Film formation | | ○ | ○ | ○ | ○ | ○ | ○ | ○ | ○ | ○ | ○ |
| Coefficient of linear thermal expansion (ppm/K) | | 43 | 41 | 46 | 42 | 41 | 48 | 43 | 41 | 39 | 45 |
| Modulus of elasticity (GPa) | | 3.3 | 7 | 3.4 | 3.6 | 3.9 | 3 | 3 | 3 | 4 | — |
| Elongation at break (%) | | 8 | 4 | 8 | 11 | 15 | 5 | 5 | 6 | 16 | — |
| Breaking strength (MPa) | | 108 | 87 | 101 | 112 | 125 | 84 | 84 | 96 | 113 | — |
| 5% weight loss temperature (°C.) | | 503 | 519 | 515 | 505 | 508 | 507 | 518 | 512 | 514 | 518 |
| Total light transmittance (%) | | 88 | 88 | 87 | 88 | 87 | 89 | 87 | 88 | 88 | 87 |

TABLE 2-3

| Polyimide precursor | | Example 21 | Example 22 | Example 23 | Example 24 | Example 25 | Example 26 | Example 27 | Example 28 | Example 29 |
|---|---|---|---|---|---|---|---|---|---|---|
| Tetracarboxylic acid component (mmol) | DNDAxx | 10 | 10 | 10 | 10 | 10 | 10 | 10 | 10 | 10 |
| | DNDAdx | | | | | | | | | |
| | CpODA | | | | | | | | | |
| Diamine component (mmol) | PPD | 5 | 2 | 7 | 4 | 4 | | 5 | 5 | 5 |
| | TFMB | | | | | | | | | |
| | DABAN | 4 | 7 | 2 | 4 | 3 | 7 | 4 | 4 | 4 |
| | APBP | | | | | | | | | |
| | AZDA | | | | | | | | | |
| | 4-APTP | | | | | | | | | |
| | ODA | | | | | | | | | |
| | FDA | | | | | | | | | |
| | m-TD | | | | | | | | | 1 |

TABLE 2-3-continued

| Polyimide precursor | Example 21 | Example 22 | Example 23 | Example 24 | Example 25 | Example 26 | Example 27 | Example 28 | Example 29 |
|---|---|---|---|---|---|---|---|---|---|
| BAPB | 1 | 1 | 1 | 2 | 3 | 3 | | | |
| TPE -R | | | | | | | 1 | | |
| TPE -Q | | | | | | | | 1 | |
| Polyimide film | | | | | | | | | |
| Film formation | ○ | ○ | ○ | ○ | ○ | ○ | ○ | ○ | ○ |
| Coefficient of linear thermal expansion (ppm/K) | 43 | 43 | 46 | 45 | 49 | 45 | 43 | 43 | 41 |
| Modulus of elasticity (GPa) | 2.9 | 3.3 | 2.8 | 2.9 | 2.7 | 2.9 | 3.1 | 3.1 | 3.4 |
| Elongation at break (%) | 9 | 11 | 6 | 30 | 28 | 42 | 10 | 9 | 7 |
| Breaking strength (MPa) | 97 | 116 | 86 | 132 | 116 | 192 | 100 | 100 | 103 |
| 5% weight loss temperature (° C.) | 519 | 521 | 520 | 519 | 517 | 518 | 519 | 519 | 515 |
| Total light transmittance (%) | 87 | 87 | 88 | 86 | 87 | 85 | 87 | 87 | 88 |

TABLE 2-4

| Polyimide precursor | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Tetracarboxylic acid component (mmol) | DNDAxx | | | | | | | | | 10 |
| | DNDAdx | 10 | 10 | 10 | 10 | 10 | 10 | 10 | 10 | |
| | CpODA | | | | | | | | | |
| Diamine component (mmol) | PPD | | | | | 10 | | 3 | 3 | |
| | TFMB | | | | | | 10 | | | |
| | DABAN | 10 | | | | | | 7 | | |
| | APBP | | 10 | | | | | | 7 | |
| | AZDA | | | 10 | | | | | | |
| | 4-APTP | | | | 10 | | | | | |
| | ODA | | | | | | | | | 10 |
| | FDA | | | | | | | | | |
| | m-TD | | | | | | | | | |
| | BAPB | | | | | | | | | |
| | TPE-R | | | | | | | | | |
| | TPE-Q | | | | | | | | | |
| Polyimide film | | | | | | | | | | |
| Film formation | | x | ○ | ○ | x | x | x | x | Δ | ○ |
| Coefficient of linear thermal expansion (ppm/K) | | — | 68 | 50 | — | — | — | — | 71 | 64 |
| Modulus of elasticity (GPa) | | — | 2.2 | 3.2 | — | — | — | — | — | 2.0 |
| Elongation at break (%) | | — | 10 | 15 | — | — | — | — | — | 27 |
| Breaking strength (MPa) | | — | 97 | 118 | — | — | — | — | — | 83 |
| 5% weight loss temperature (° C.) | | — | 479 | 480 | — | — | — | — | — | 502 |
| Total light transmittance (%) | | — | 81 | 86 | — | — | — | — | 70 | 88 |

As can be seen from the results shown in Tables 2-1 to 2-4, the polyimides obtained from the polyimide precursors of the present invention (Examples 1 to 29) can be formed into a film (Example 1 and Comparative Example 1, Example 8 and Comparative Example 4, Example 6 and Comparative Example 5, Example 7 and Comparative Example 6), and have a smaller coefficient of linear thermal expansion (Example 2 and Comparative Example 2, Example 3 and Comparative Example 3), as compared with Comparative Examples 1 to 9. As for the heat resistance, the polyimides of the present invention also have high heat resistance (Example 2 and Comparative Example 2, Example 3 and Comparative Example 3). When DNDAxx is used as the tetracarboxylic acid component and a diamine to provide the chemical formula (2) or the chemical formula (3) is used as the diamine component, the coefficient of linear thermal expansion is small (Examples 1 to 29 and Comparative Example 9). When DABAN, PPD or TFMB is co-polymerized, both high transparency and low linear thermal expansibility are achieved (Examples 9 to 14, 16 to 25, and 28 to 29). Thus, a problem of swelling associated with the decomposition of the polyimide between a gas barrier film and the polyimide, a problem of warpage during the formation of a circuit board, and the like may not arise.

As described above, the polyimide obtained from the polyimide precursor of the present invention has excellent optical transparency, bending resistance and heat resistance, and has a low coefficient of linear thermal expansion, and therefore the polyimide film of the present invention may be suitably used as a transparent substrate for use in a display, and the like, which is colorless and transparent and on which a fine circuit can be formed.

INDUSTRIAL APPLICABILITY

According to the present invention, there may be provided a polyimide having excellent properties such as high transparency, bending resistance and high heat resistance, and having a very low coefficient of linear thermal expansion; and a precursor thereof. The polyimide obtained from the polyimide precursor, and the polyimide have high transparency and a low coefficient of linear thermal expansion, which allows easy formation of a fine circuit, and also have solvent resistance, and therefore the polyimides may be suitably used for the formation of a substrate for use in a display, a touch panel or a solar battery, or the like, in particular.

The invention claimed is:

1. A polyimide precursor comprising a repeating unit represented by the following chemical formula (1):

Chemical formula (1)

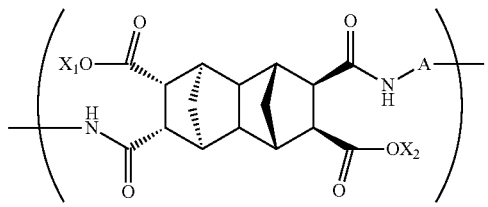

wherein A is a divalent group of an aromatic diamine or an aliphatic diamine from which amino groups have been removed; and $X_1$ and $X_2$ are each independently hydrogen or an alkylsilyl group having 3 to 9 carbon atoms, wherein the polyimide precursor comprises at least one type of repeating unit represented by the chemical formula (1) in which A is a group represented by the following chemical formula (2-2):

Chemical formula (2-2)

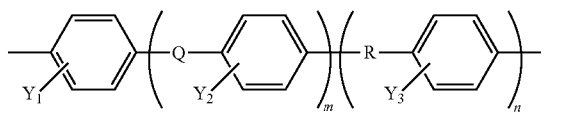

wherein m independently represents 0 to 2 and n independently represents 0 to 2; $Y_1$, $Y_2$ and $Y_3$ each independently represents at least one selected from the group consisting of a hydrogen atom, a methyl group and a trifluoromethyl group; and Q and R each independently represent a direct bond, an ester or an amide, and wherein the ratio of the repeating units represented by the chemical formula (1) in which A is a group represented by the chemical formula (2-2) is 50 mol % or more in total based on 100 mol % of the repeating unit represented by the chemical formula (1).

2. The polyimide precursor according to claim 1, wherein the polyimide precursor comprises the repeating unit represented by the chemical formula (1) in a ratio of 50 mol % or more in total based on the total repeating units.

3. The polyimide precursor according to claim 1, wherein the polyimide precursor comprises the repeating unit represented by the chemical formula (1) in a ratio of 70 mol % or more in total based on the total repeating units.

4. The polyimide precursor according to claim 1, wherein m+n is 0 to 3 in the chemical formula (2-2).

5. The polyimide precursor according to claim 1, wherein A in the chemical formula (1) is a group derived from a diamine selected from the group consisting of p-phenylenediamine, 2,2'-bis(trifluoromethyl)benzidine, m-tolidine, 4,4'-diaminobenzanilide, N,N'-bis(4-aminophenyl)terephthalamide, bis(4-aminophenyl)terephthalate and biphenyl-4,4'-dicarboxylic acid bis(4-aminophenyl)ester.

6. A polyimide obtained from the polyimide precursor according to claim 1.

7. The polyimide according to claim 6, wherein the polyimide has a coefficient of linear thermal expansion from 50° C. to 200° C. of 50 ppm/K or less and a 5% weight loss temperature of more than 480° C.

8. A varnish comprising the polyimide precursor according to claim 1.

9. A polyimide film obtained using a varnish comprising the polyimide precursor according to claim 1.

10. A substrate for a display, a touch panel or a solar battery formed of the polyimide obtained from the polyimide precursor according to claim 1.

11. A polyimide comprising a repeating unit represented by the following chemical formula (4):

Chemical formula (4)

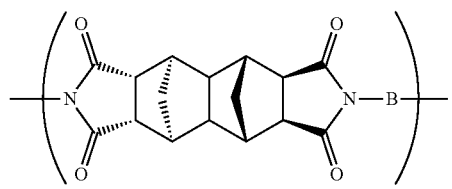

wherein B is a divalent group of an aromatic diamine or an aliphatic diamine, from which amino groups have been removed, wherein the polyimide comprises at least one type of repeating unit represented by the chemical formula (4) in which B is a group represented by the following chemical formula (5-2):

Chemical formula (5-2)

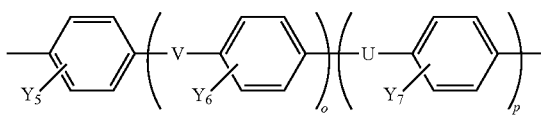

wherein o independently represents 0 to 2 and p independently represents 0 to 2; $Y_5$, $Y_6$ and $Y_7$ each independently represents at least one selected from the group consisting of a hydrogen atom, a methyl group and a trifluoromethyl group; and V and U each independently represents a direct bond an ester or an amide, and wherein the ratio of the repeating units represented by the chemical formula (4) in which B is a group represented the chemical formula (5-2) is 50 mol % or more in total based on 100 mol % of the repeating unit represented by the chemical formula (4).

12. The polyimide according to claim 11, wherein the polyimide comprises the repeating unit represented by the chemical formula (4) in a ratio of 50 mol % or more in total based on the total repeating units.

13. The polyimide according to claim 11, wherein the polyimide comprises the repeating unit represented by the chemical formula (4) in a ratio of 70 mol % or more in total based on the total repeating units.

14. The polyimide according to claim 11, wherein the polyimide has a coefficient of linear thermal expansion from 50° C. to 200° C. of 50 ppm/K or less and a 5% weight loss temperature of more than 480° C.

15. The polyimide according to claim 11, wherein o+p is 0 to 3 in the chemical formula (5-2).

16. The polyimide according to claim 11, wherein A in the chemical formula (4) is a group derived from a diamine selected from the group consisting of p-phenylenediamine, 2,2'-bis(trifluoromethyl)benzidine, m-tolidine, 4,4'-diaminobenzanilide, N,N'-bis(4-aminophenyl)terephthalamide, bis(4-aminophenyl)terephthalate and biphenyl-4,4'-dicarboxylic acid bis(4-aminophenyl)ester.

17. A varnish comprising the polyimide according to claim 11.

18. A polyimide film obtained using a varnish comprising the polyimide according to claim 11.

19. A substrate for a display, touch panel or solar battery formed from the polyimide according to claim 11.

* * * * *

UNITED STATES PATENT AND TRADEMARK OFFICE
CERTIFICATE OF CORRECTION

PATENT NO. : 10,174,166 B2
APPLICATION NO. : 14/426953
DATED : January 8, 2019
INVENTOR(S) : Takuya Oka et al.

Page 1 of 1

It is certified that error appears in the above-identified patent and that said Letters Patent is hereby corrected as shown below:

In the Specification

Column 2, Line 25, "aminophenoxyl)" should be --aminophenoxy)--.

Column 3, Line 32, "(1);" should be --(1):--.

Column 6, Line 37, "-2 t,3t," should be -- -2t,3t,--.

Column 10, Line 36, "his" should be --bis--.

Column 10, Line 38, "his" should be --bis--.

Column 11, Line 18, "(4-aminophenoxyl)" should be --(4-aminophenoxy)--.

Column 11, Line 23, "(4-aminophenoxyl)" should be --(4-aminophenoxy)--.

Column 19, Line 61, "-2 t,3t," should be -- -2t,3t,--.

In the Claims

Column 46, Line 46 (Claim 11), after "bond" insert --,--.

Column 46, Line 49, after "represented" insert --by--.

Signed and Sealed this
Twenty-eighth Day of May, 2019

Andrei Iancu
*Director of the United States Patent and Trademark Office*